March 3, 1964 A. G. BODINE, JR 3,123,043
METHOD AND APPARATUS FOR TRANSMITTING SONIC
VIBRATIONS INTO LIQUID BODIES
Filed Nov. 14, 1960 13 Sheets-Sheet 1

INVENTOR.
ALBERT G. BODINE, JR.
BY
*Lilly and Nyheger*
ATTORNEYS

March 3, 1964 A. G. BODINE, JR 3,123,043
METHOD AND APPARATUS FOR TRANSMITTING SONIC
VIBRATIONS INTO LIQUID BODIES
Filed Nov. 14, 1960 13 Sheets-Sheet 2
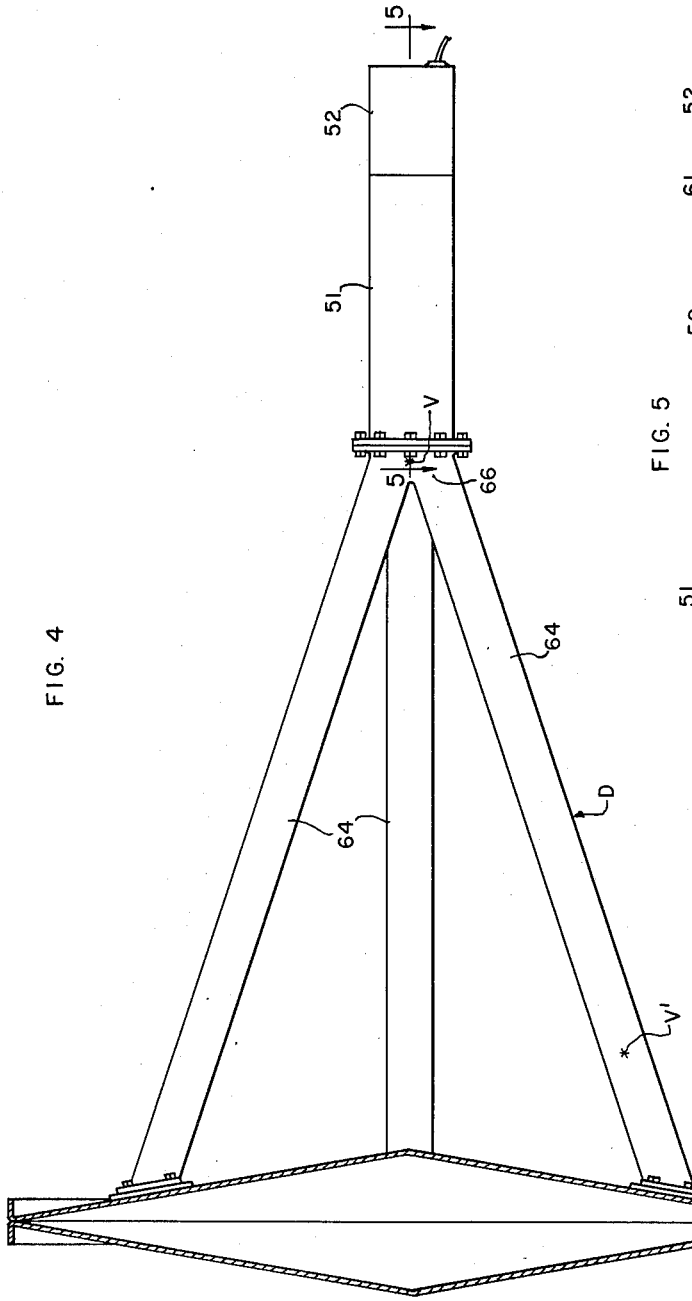
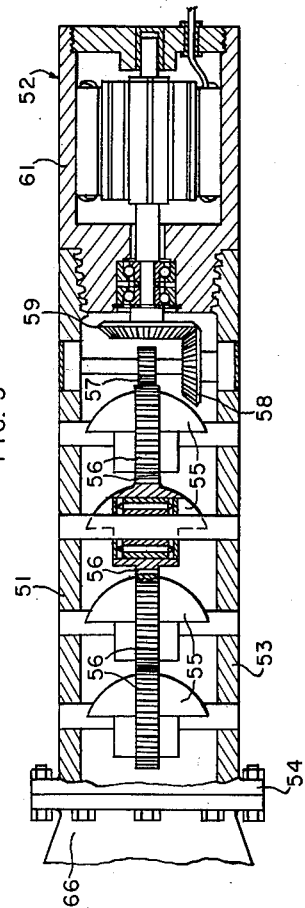
INVENTOR.
ALBERT G. BODINE, JR
BY
Lilly and Nyhagen
ATTORNEYS.

March 3, 1964 A. G. BODINE, JR 3,123,043
METHOD AND APPARATUS FOR TRANSMITTING SONIC
VIBRATIONS INTO LIQUID BODIES
Filed Nov. 14, 1960 13 Sheets-Sheet 3

INVENTOR.
ALBERT G. BODINE, JR
BY
*Lilly and Nyhagen*
ATTORNEYS.

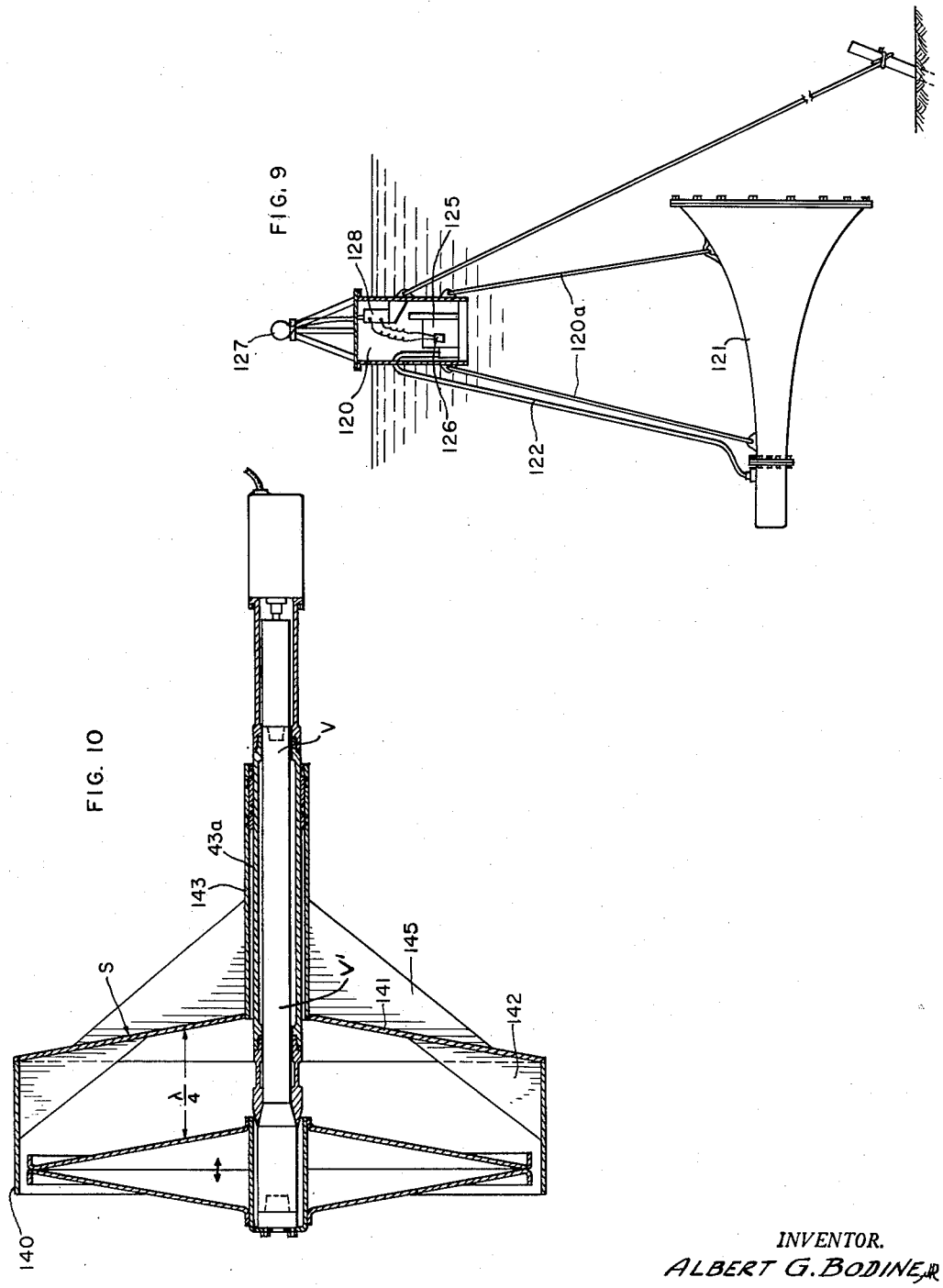

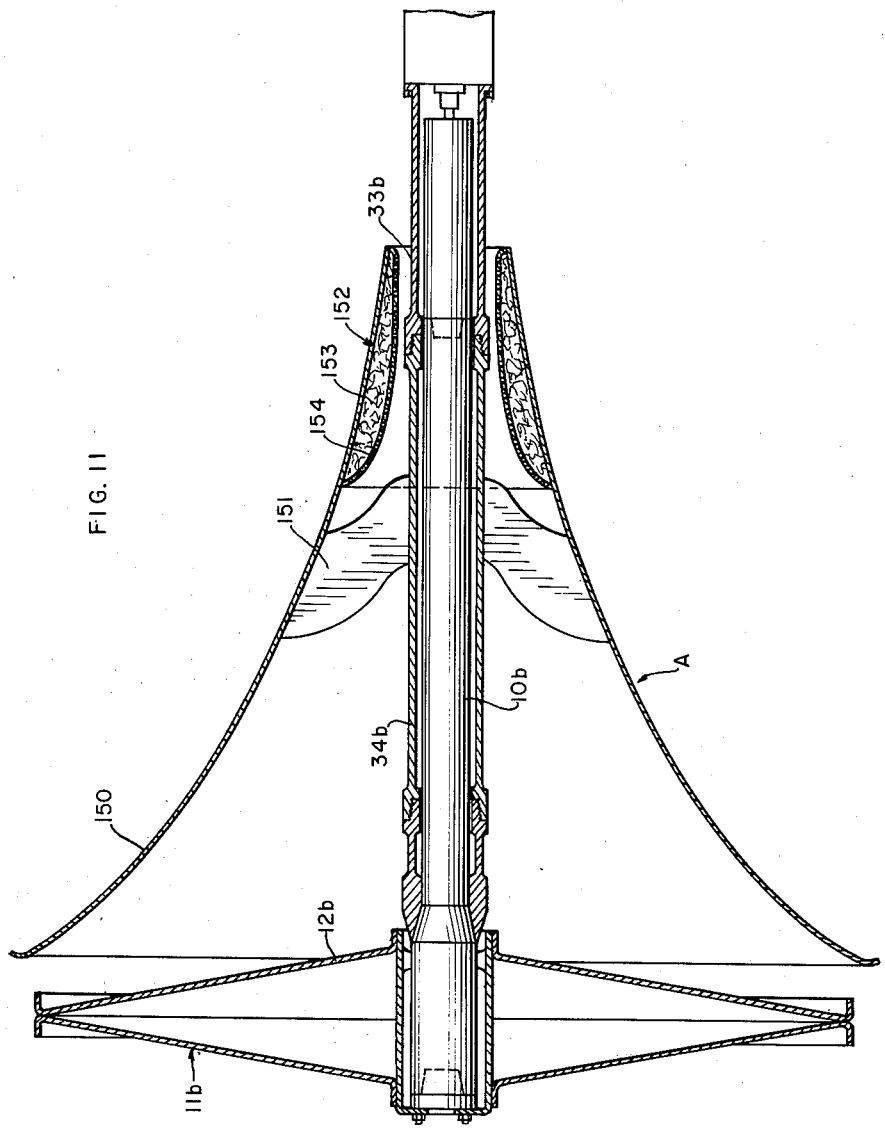

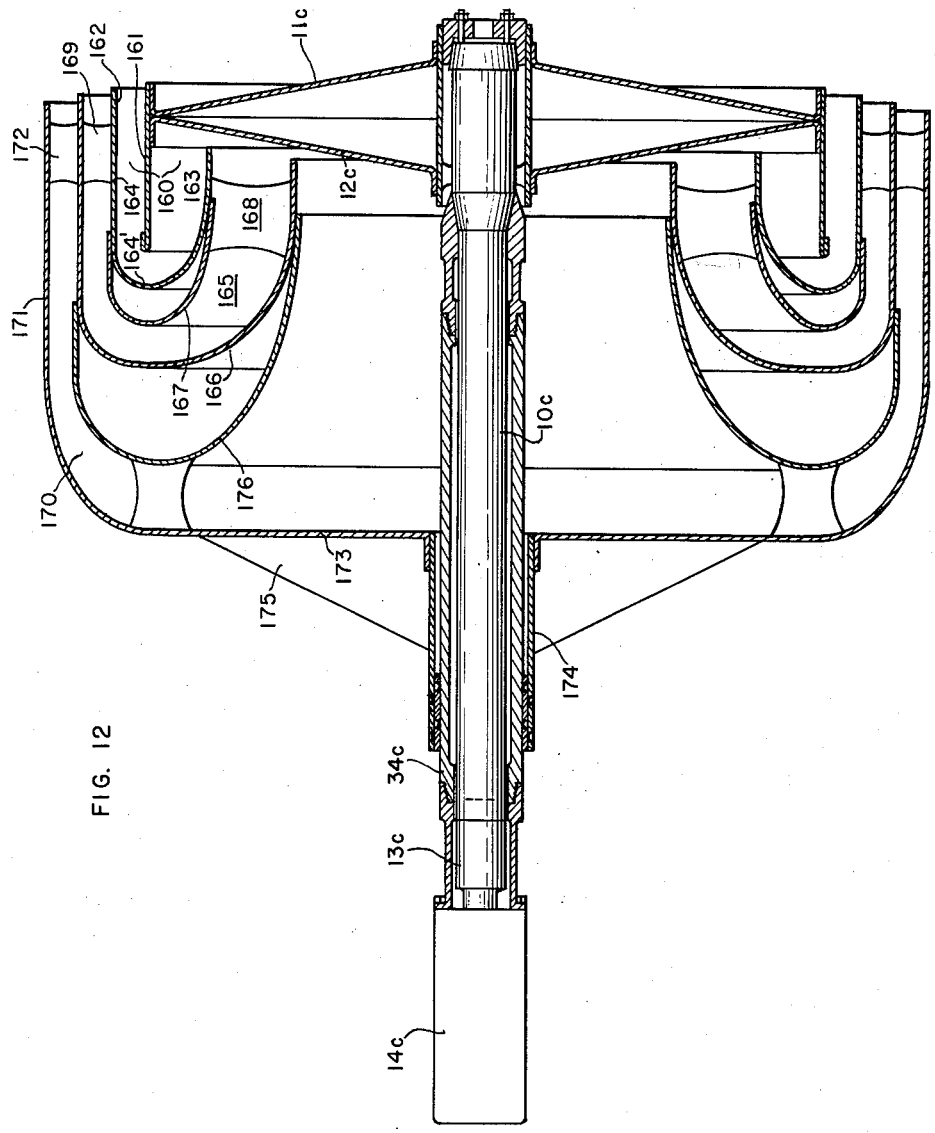

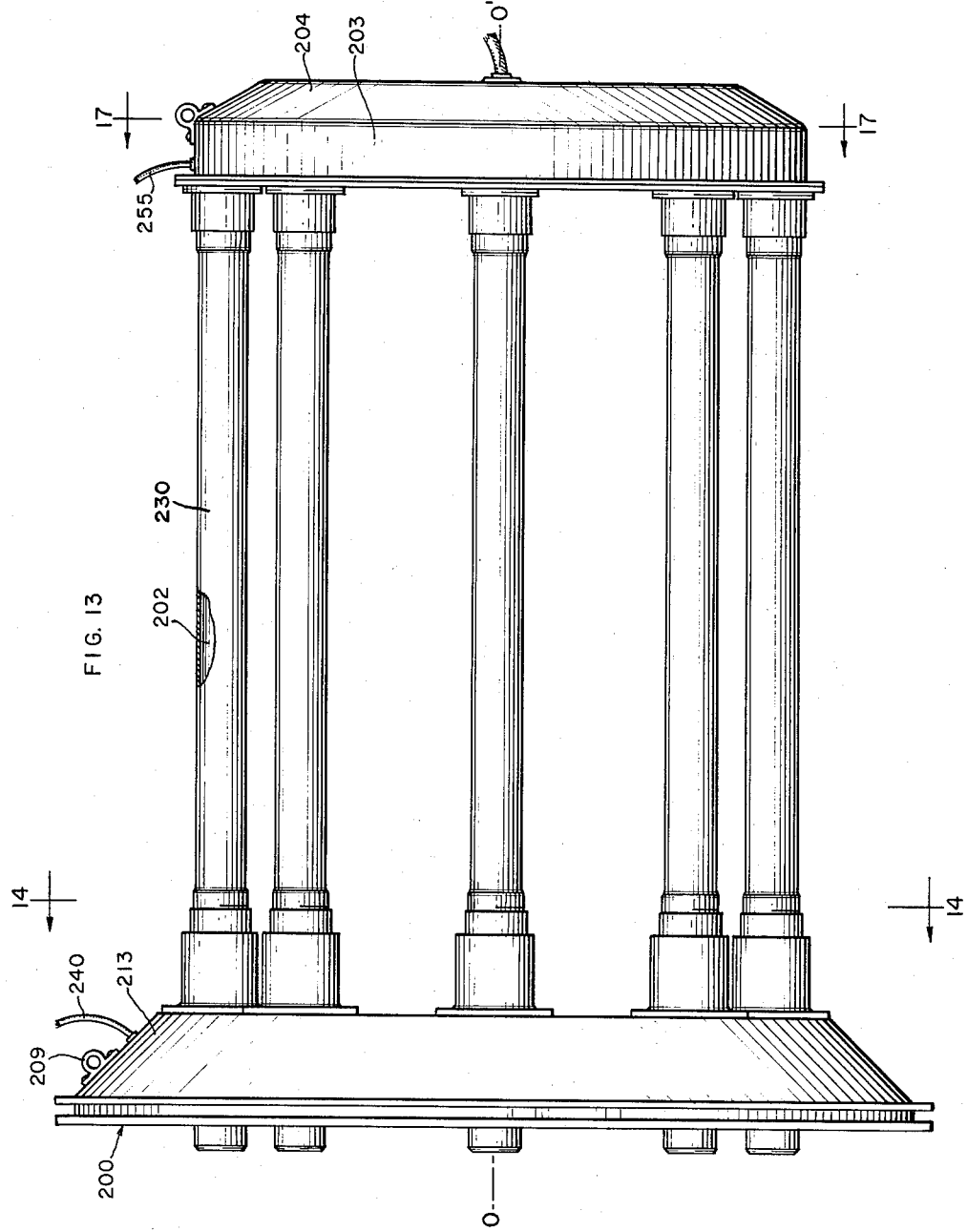

March 3, 1964 A. G. BODINE, JR 3,123,043
METHOD AND APPARATUS FOR TRANSMITTING SONIC
VIBRATIONS INTO LIQUID BODIES
Filed Nov. 14, 1960 13 Sheets-Sheet 8

INVENTOR.
ALBERT G. BODINE JR
BY
Lilly and Nyhagen
ATTORNEYS.

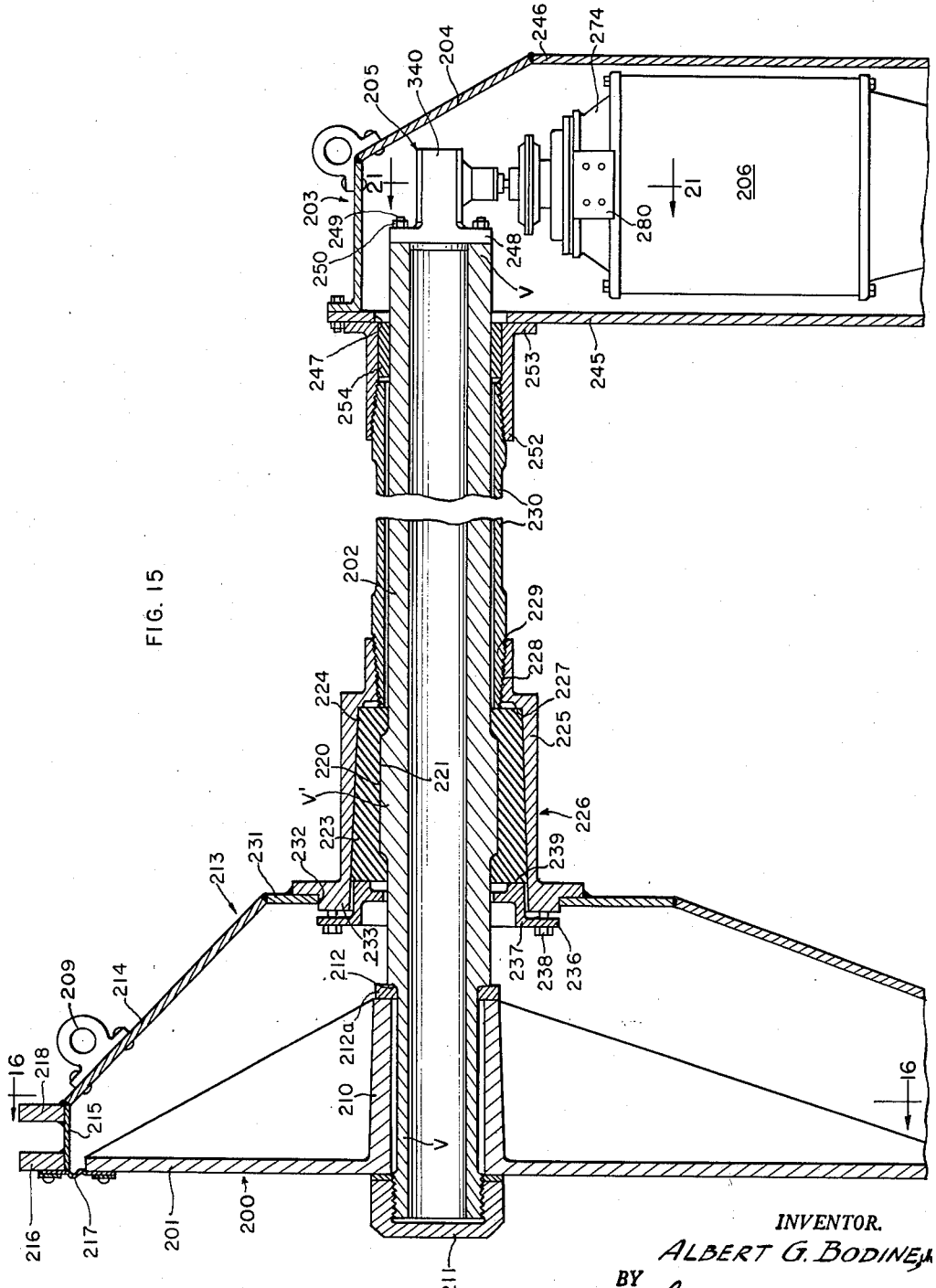

March 3, 1964 A. G. BODINE, JR 3,123,043
METHOD AND APPARATUS FOR TRANSMITTING SONIC
VIBRATIONS INTO LIQUID BODIES
Filed Nov. 14, 1960 13 Sheets-Sheet 10

INVENTOR.
ALBERT G. BODINE, JR.
BY Lilly and Nyhagen
ATTORNEYS.

March 3, 1964
A. G. BODINE, JR
3,123,043
METHOD AND APPARATUS FOR TRANSMITTING SONIC
VIBRATIONS INTO LIQUID BODIES
Filed Nov. 14, 1960
13 Sheets-Sheet 11
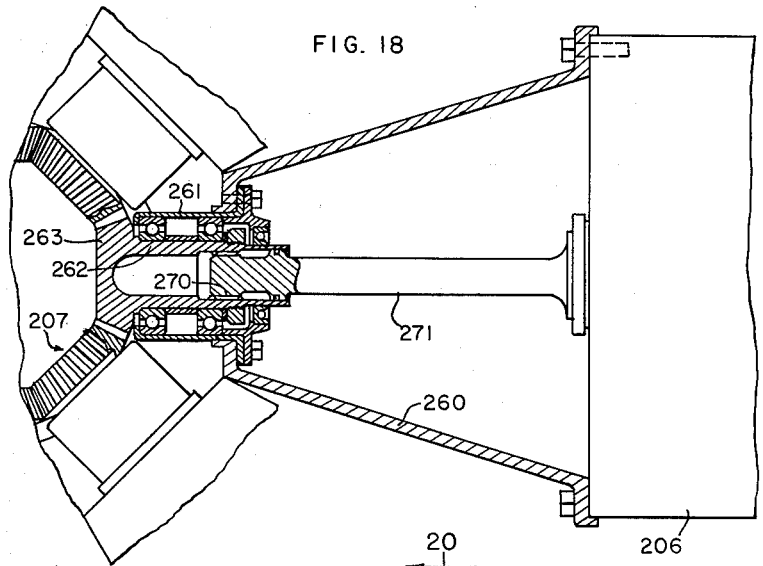
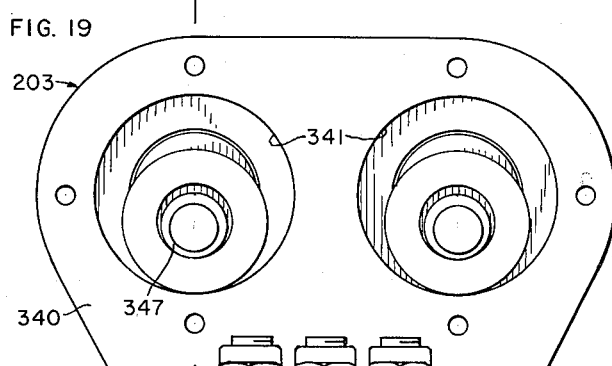
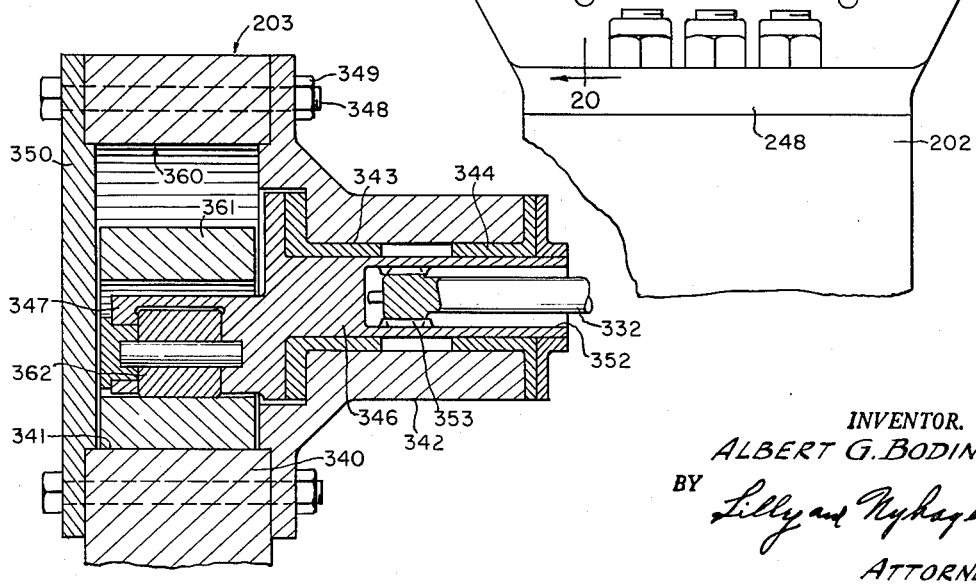
INVENTOR.
ALBERT G. BODINE, JR
BY
*Lilly and Nyhagen*
ATTORNEYS.

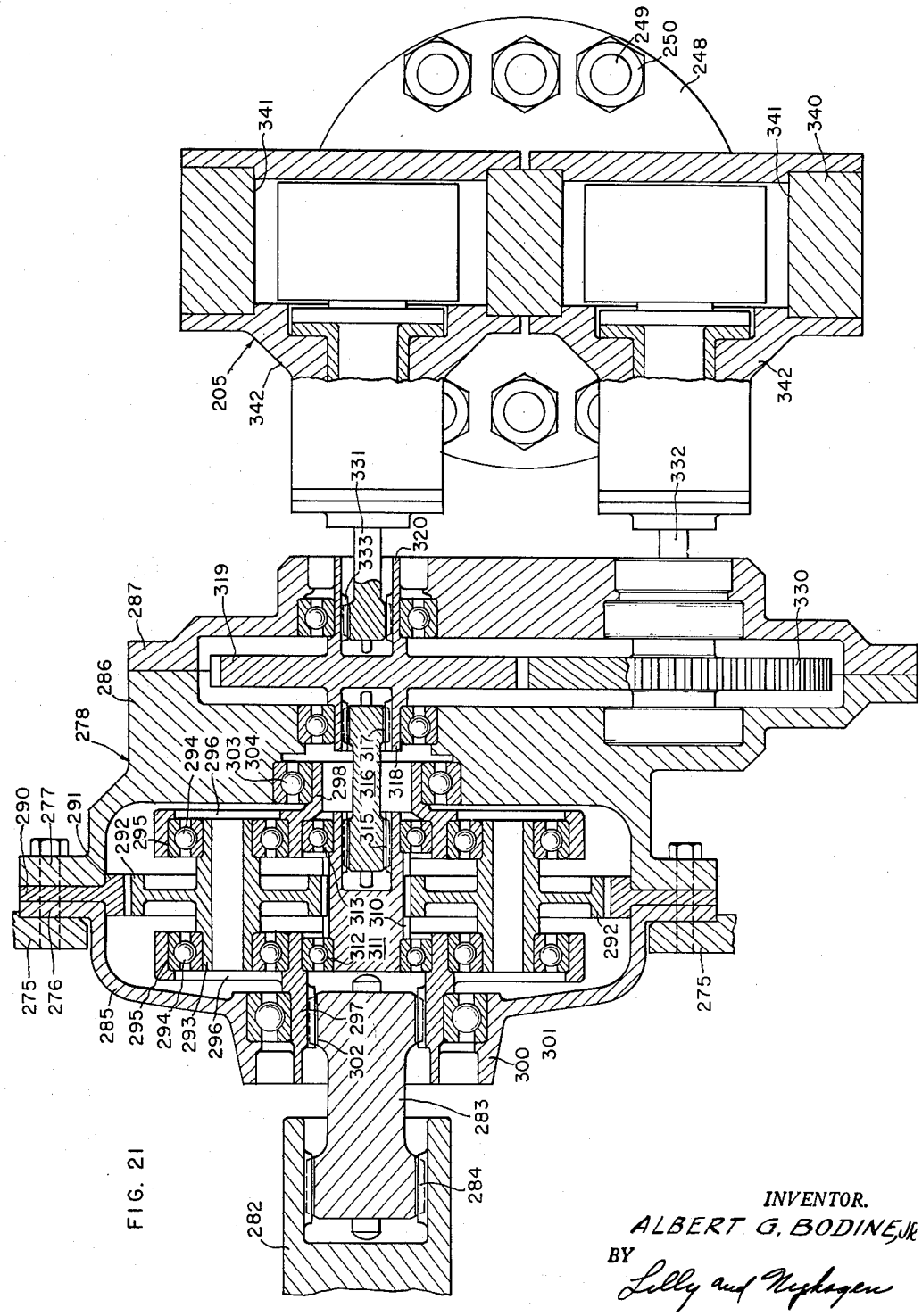

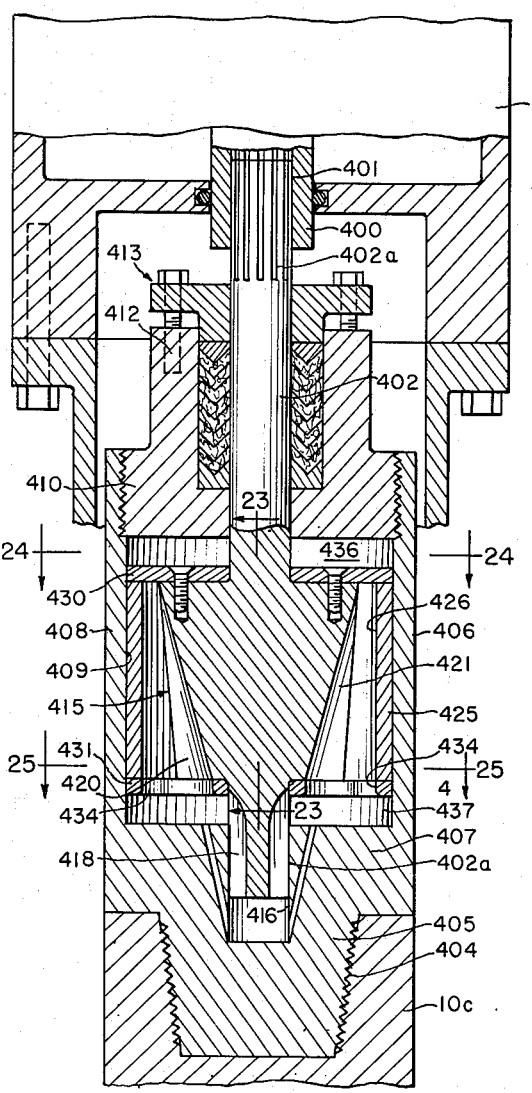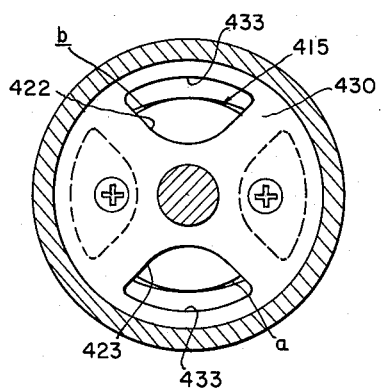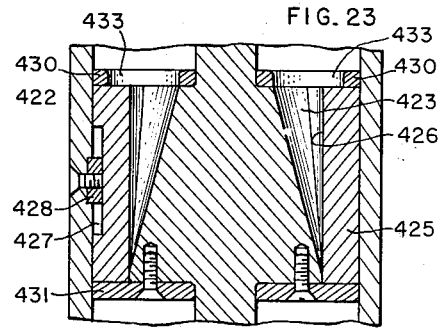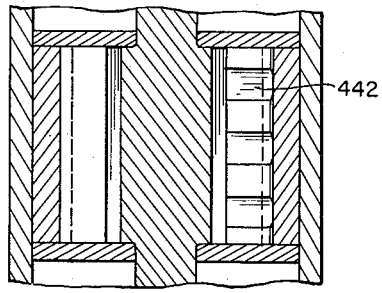

United States Patent Office 3,123,043
Patented Mar. 3, 1964

3,123,043
METHOD AND APPARATUS FOR TRANSMITTING SONIC VIBRATIONS INTO LIQUID BODIES
Albert G. Bodine, Jr., 13120 Moorpark St., Sherman Oaks, Calif.
Filed Nov. 14, 1960, Ser. No. 68,804
25 Claims. (Cl. 116—137)

This invention relates generally to high power acoustic apparatus for generating high energy sound waves of relatively low frequency in liquids, for such purposes as sonic liquid treatment in large process tanks, sonically cleaning large liquid tanks, etc. The invention is useful also for transmitting high energy pressure waves for substantial distances through extended bodies of water, such as the ocean, to create an underwater sound field useful in submarine detection.

This application is a continuation-in-part of my copending application Serial No. 9,349, filed February 17, 1960, now Patent No. 3,033,158, entitled Method and Apparatus for Transmitting Sonic Vibrations Into Liquid Bodies, which was a continuation-in-part of my application Serial No. 825,117 filed July 6, 1959, now Patent No. 2,960,314 entitled Method and Apparatus for Generating and Transmitting Sonic Vibrations, which was in turn a continuation-in-part of my application Serial No. 484,627, filed January 28, 1955, now abandoned.

This invention contemplates very high sonic power, relatively low frequency, which, without intention of limitation, may be typically between 200 and 2000 cycles per second, and rugged mechanical oscillators for generating the sound waves.

Objects of the invention include the provision of improved sonic processing or wave generating and radiating apparatus characterized by extraordinary power, relatively low frequency, simple and rugged mechanical oscillators of the oscillating mass (inductive) type, of low cost but high reliability, unusually high efficiency for a sonic processing machine, excellent frequency stability, and ready portability.

In accordance with the invention, there is provided a vibratory sound wave radiator in coupling contact with the liquid, preferably in the general form of a flat or relatively flat surface, typically a disk or flat cone of about 12' in diameter for one selected frequency, as will be more fully described later. The vibratory surface of this radiator reciprocates a large piston-like plug of liquid, of considerable mass, in contact therewith and a strong compressional sound wave is thereby radiated from the surface into the liquid. The vibratory radiation surface is said to be "loaded" by the liquid. For radiation of a powerful sound wave from this radiator, the radiator must be vibrated with very high force, though the velocity and displacement of the vibration is characteristically relatively low. This is a highly desirable condition for powerful sound wave radiation, described in sonic terminology as "high mechanical impedance." Because of the large load, and the high impedance requirement, certain special problems are encountered in finding an adequate drive means for the radiator.

At this point, the expression "mechanical impedance," and some other concepts relied upon hereinafter, may well be defined. Mechanical impedance of a sound transmitting medium at a given surface lying in a wave front is the complex quotient of the force on that surface divided by the linear velocity of the surface. The mechanical impedance of the liquid-loaded radiator of the invention is then the quotient of the driving force applied to the radiator divided by the linear velocity of the radiator moving in contact with the loading liquid body.

A useful analogy between a mechanical vibratory system and an electrical circuit having inductance, capacitance and resistance in series is brought out by a comparison of the differential equations defining the behaviors of the respective systems:

$$M\frac{dv}{dt}+R_m v+\frac{1}{C_s}\int v\,dt=F$$

$$L\frac{di}{dt}+R_i i+\frac{1}{C}\int i\,dt=E$$

In the first equation, M represents mass, $R_m$ frictional resistance, $C_s$ is elastic compliance (the reciprocal of elastic stiffness), $v$ is velocity and F is force. In the second, L is inductance, R is electrical resistance, C is electrical capacitance, $i$ is current, and E is voltage. It will be noted that the differential equations are of similar form, and that the constants of mass M and inductance L occupy corresponding positions in the two. They are therefore considered analogous.

From this circumstance, a vibrating mass in a mechanically vibratory system is commonly referred to as "inductive," or an oscillator or cyclic force generator of an oscillative mass type, such as referred to herein, as "inductive" in character. Also, a liquid body in contact with a vibratory radiator so as to receive and transmit compressional waves, constitutes because of the reciprocated liquid mass an "inductive" load. Not only must the radiator be vibrated with sufficient force to satisfy radiation impedance (the power-consuming component of impedance at the radiator), but the inductive reactance of the liquid load must be overcome. In like manner, an elastically vibratory component of a vibratory system is said to be "capacitative" in character.

To assure a large liquid load on the radiator, the dimension across the surface of the radiator is made at least a major fraction of a wave length of the sound wave to be radiated thereby, measured in the liquid. An optimum dimension is substantially one wave length, and a dimension up to two wave lengths, or even more, might in some cases be used, though at such dimension the radiator may be overly large for practical purposes.

Assuming a radiator of optimum dimensions, therefore, i.e., one wave length across, and assuming a frequency of 400 cycles per second, which is a desirable frequency for many applications, the diameter of the radiator, using a value of 4800 feet per second for the velocity of sound in water, is of the order of 12 feet. A vibratory radiator of such scale, immersed in liquid, is heavily loaded, and must be driven so that it can operate against the liquid at high impedance if a powerful wave is to be radiated.

One problem presented is to provide an effective vibratory drive means for this necessarily high impedance radiator. A preferred feature of the invention is to use for this purpose the combination of an inductively reactive cyclic force generator, a number of examples of which are disclosed in my Patent No. 3,033,158, and an elastic bar, of capacitative reactance, which has a number of functions, as will appear. The force generator is of a type involving an oscillative inertia mass, which may rotate or move in a circular or elliptical orbital path, or may reciprocate linearly. In each case, a means is provided to define and confine the path of the moving mass, This confining means may be, for example, a bearing trunnion, a raceway, or a hydraulic cylinder. Such confining means must be strong and robust in themselves, and must also be fixed to or a part of a basic support structure such as a heavy frame or housing. The periodic acceleration of the moving mass, angular in the case of a turning mass, and linear in the case of straight line reciprocation, produces a periodic vibrating or shaking force on such confining means and basic support structure, causing vibration thereof.

The product of the mass of the oscillating inertia mass and its velocity must of course always equal the product of the mass and velocity of the confining means and basic support structure. The moving inertia mass being relatively small, and its velocity large, its mechanical impedance is small. The confining means for this oscillatory mass and the basic frame structure, on the other hand, is relatively large and massive; its velocity is therefore comparatively small, while its force is elevated. The frame structure or housing of the device accordingly constitutes a source of cyclic force at considerably elevated impedance. It will be noted that elevation in impedance has involved a substantial gain in force at the expense of velocity.

However, notwithstanding the gain in impedance, the output impedance of such a force generator is still of too low an order for direct drive of the liquid loaded radiator, whose radiation resistance and inductive reactance are much too high for a suitable impedance match between it and the generator. It is thus indicated that a further step-up in impedance is required, and a means to this end will be disclosed presently.

In accordance with principles disclosed in my aforementioned Patent No. 2,960,314, a force generator of the type described hereinabove can be very advantageously controlled to operate at the selected resonant frequency, with good frequency stability, high Q, and an important energy storage property (fly-wheel effect), by coupling it directly to an elastically vibratory half-wavelength bar structure, which vibrates at the desired operating frequency in a resonant standing wave pattern, and which is in turn coupled to the device to be driven, in this case, the sound wave radiator. The coupling between the generator and this half-wave standing wave bar structure is made to a velocity antinode at one end of the latter, this point of the bar being fairly well adjusted to the output impedance of the generator.

Under such conditions the oscillator housing assembly moves with a velocity which is small relative to the oscillative mass of the generator, but which is still large enough to conform to the velocity antinode condition at the corresponding end of the bar. By thus coupling the generator housing to a velocity antinode of the bar structure, where impedance is of the order of that of the generator, an important advantage is gained, in that the bar structure, vibrating at substantial amplitude at the antinode coupling point, exerts a back reaction through the supporting body of the generator and its bearing means, or other constraining means for the small oscillative inertia body of the generator, which, further supposing a properly governed drive effort on the oscillative body, constrains that body to oscillate at closely controlled frequency which is just under the frequency for peak amplitude resonance. It is sometimes critically important that the driving force on the oscillative body be less than that which would take the oscillative mass to or over the basic resonant frequency of the system. Under such conditions, operating frequency is stabilized, and a fairly high frequency operation made possible for a powerful form of mechanical oscillator.

Returning to the problem of impedance adjustment or match between that of the force generator and the high impedance of the large liquid loaded radiator, the half-wavelength resonant standing wave bar, disclosed in my Patent No. 2,960,314 and referred to hereinabove, permits effective operation of the generator, but does not, without further improvement, furnish an impedance at its output end which, in numerical magnitude, corresponds closely enough to that of the liquid loaded radiator for effective drive of the latter. There also must still be considered, as will be done hereinafter, the problem presented by the fact that both the generator and liquid loaded radiator are inductively reactive, giving bad power factor.

A prerequisite to a good understanding of the present invention, in the aspect of meeting the problems stated in the preceding paragraph, is a full understanding of a half-wavelength standing wave bar, and its impedance characteristics, and this subject will next be given attention.

Assume an elongated steel (elastic) bar, of uniform cross-section, suspended in a "free-free" state, i.e., supported at its mid-point, and free for longitudinal vibration at both ends. Assume further a cyclic force generator coupled to one end of the bar, so as to apply a sinusoidal force thereto in a direction longitudinally of the bar, and at a frequency $f$ equal to $s/2Ln$, where $s$ is the speed of sound in the material of the bar, and $Ln$ is the length of the bar. Under these conditions, alternating sinusoidal waves of compression and tension are launched by the force generator into the bar. These travel the length of the bar, are reflected from the far end thereof as waves of unlike kind (i.e., a wave of compression is reflected as a wave of tension, and vice versa), and by virtue of interference between the initial and reflected waves when $f=s/2Ln$, a half-wavelength resonant standing wave is established. Under these conditions, longitudinal wave amplitude is cancelled at the mid-point of the bar, and is magnified at the two ends thereof. In effect, the two half portions of the bar alternately elastically elongate and contract, in step with one another, the magnitude of elastic elongation and contraction increasing progressively from zero, or substantially so, at the mid-point to maximum at the ends. The condition at the mid-point of the bar is called a velocity node, and is characterized by minimized cyclic velocity amplitude, and by maximized cyclic stress amplitude. The condition at each end of the bar is called a velocity antinode, and is characterized by maximized cyclic velocity amplitude, and minimized cyclic stress amplitude.

There is a gradual transition of mechanical impedance from relatively high at the velocity node to relatively low at the velocity antinodes. At the velocity antinodes, the impedance is easily adjustable to the output impedance of a mechanical cyclic force generator of the type herein above mentioned, but is far too low for effective drive of the liquid loaded sound radiator.

The present invention meets this problem by reducing the quarter-wavelength portion of the bar between the velocity node and the coupling to the radiator to typically 5-10% of its original quarter-wavelength, or in other words to the approximate range of typically ⅟₄₀ to ⅟₈₀ wavelength. The extremity of the shortened wavelength portion of the bar is then directly coupled to the sound wave radiator. The bar in this form, so coupled to the radiator, still operates with a standing wave pattern, at the original resonant frequency, but the pattern from the node out to the coupling point to the radiator is a small fraction of a quarter-wavelength. And at the extremity, which is close spaced to the node, the mechanical impedance is very high, and of the order of that of the liquid loaded radiator. Numerically, then, by a series of steps, the low impedance of the oscillative mass of the generator is adjusted to the high impedance of the liquid-loaded radiator.

It is not enough, however, to consider merely adjustment of the numerical magnitudes of generator and load impedances. It will be seen that both the liquid loaded radiator and the force generator are inductively reactive. An inductive load cannot be effectively driven by an inductive generator, even if impedances are numerically equal. An inductive generator, by itself, has a relatively poor power factor, and when connected directly to an inductive load, which also causes poor power factor, the power factor of the system is especially bad. Good power transfer into the load is not realized. The inductive load acts as a blocking impedance, and the generator is stalled. Both the generator and the load waste the available force of the generator.

Further objects of the invention, accordingly, are to cure these additional problems.

The elastic bar, mentioned hereinabove, of course possesses both mass and elasticity. It is so designed as to have a capacitative reactance, of the desired magnitude, at the predetermined operating frequency. This is accomplished by making the bar short enough to have a resonant frequency of its own which is higher than that of the overall system. A suitable design is well within the skill of those skilled in the sonics art. The elastic capacitative bar then provides the following benefits:

(1) The generator case is of high inductive reactance, is a waster of force, and tends to stall the generator. The capacitative bar "tunes" this high inductive reactance out of the system, conserves the otherwise wasted force, and permits application of the generator force (actually, with considerable amplification) to the radiator.

(2) The liquid-loaded radiator also has high inductive reactance, and the elastic capacitative bar tunes this inductive reactance out of the system in a similar manner.

(3) By introducing a capacitative reactance into the system, the poor power factor resulting from an inductive generator directly coupled to an inductive load, is entirely cured.

With reference now to the drawings:

FIG. 4 is a view similar to FIG. 1 but showing a modification;

FIG. 5 is a longitudinal section on line 5—5 of FIG. 4;

FIG. 9 shows an apparatus in accordance with the invention supported in the ocean by a buoy;

FIG. 10 is a view similar to FIG. 1 but showing a modification;

FIG. 11 is a view similar to FIG. 1 but showing another modification;

FIG. 12 is a view similar to FIG. 1 but showing still another modification;

FIG. 13 is a side elevation of view of another embodiment of the invention;

FIG. 15 is a section taken in accordance with line 15—15 of FIG. 14;

FIG. 18 is a view similar to a portion of FIG. 17, to a larger scale, and with certain parts broken away to reveal underlying structure;

FIG. 19 is a fragmentary elevational view taken in accordance with arrows 19—19 in FIG. 17;

FIG. 20 is a sectional view taken in accordance with line 20—20 of FIG. 19;

FIG. 21 is a section taken in accordance with the line 21—21 of FIG. 15;

FIG. 22 is a longitudinal medial section of a hydraulic type of cyclic force generator which may be used in the invention, and is here illustrated in connection with the embodiment of FIG. 12;

FIG. 23 is a section taken on line 23—23 of FIG. 22;

FIG. 24 is a section taken on line 24—24 of FIG. 22;

FIG. 25 is a section taken on line 25—25 of FIG. 22; and

FIG. 26 is a section taken on line 26—26 of FIG. 25.

Figure 2:
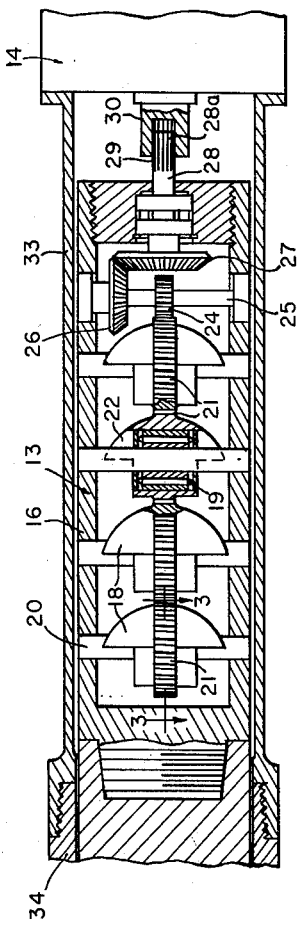
FIG. 2 is a section on line 2—2 of FIG. 1.
Figure 3:
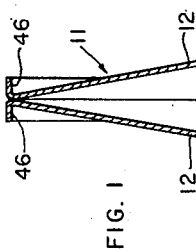
FIG. 3 is a section on line 3—3 of FIG. 2.
Figure 1:
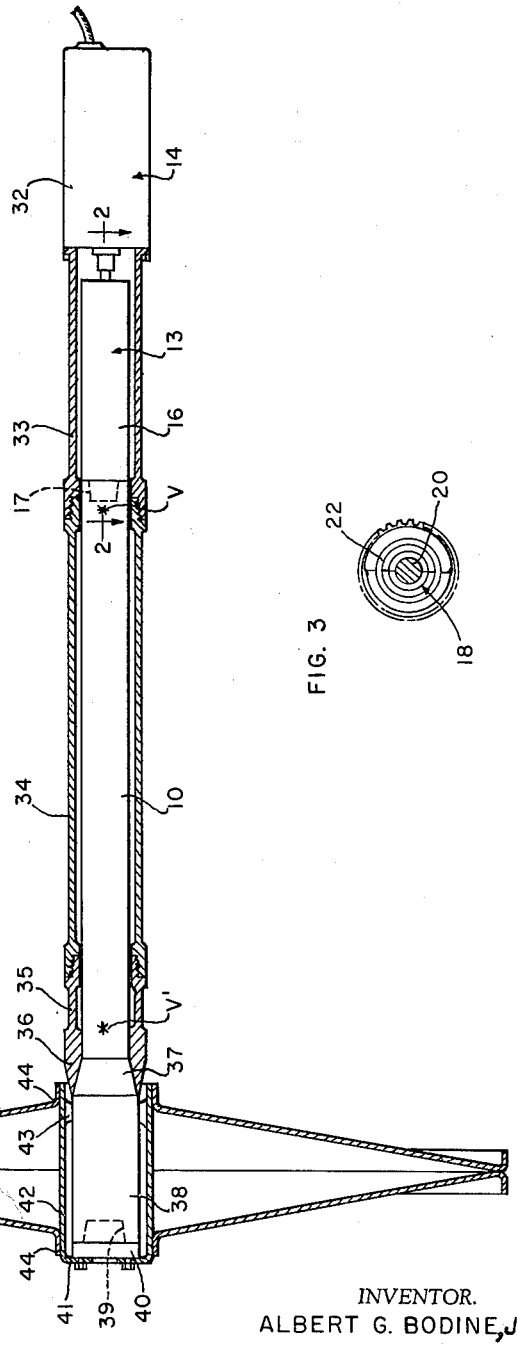
FIG. 1 is a longitudinal sectional view through an illustrative apparatus in accordance with the invention.

In FIGS. 1, 2 and 3, an elastic bar 10, preferably steel and in the form of an elongated cylinder, mounts at one end a sound wave radiator 11, in this case in the form of two flat sheet metal cones 12, back to back. Secured to the opposite end of bar 10 is an alternating force generator 13. The force generator 13 is of a type containing a small oscillative inertia body constrained to move in a predetermined cyclic path, a number of suitable examples of which are disclosed in my aforementioned Patent No. 2,960,314. However, I here show a type having eccentrically weighted rotors driven through appropriate gearing from an electric motor 14, preferably an induction motor.

Force generator 13 comprises a cylindric body or case 16 having at one end a threaded coupling pin 17 screwed into a threaded socket at the adjacent end of bar 10, so as to afford a secure, rigid coupling between the generator case and bar 10. Inside case 16 is a series of eccentrically weighted rotors 18 rotatably mounted through suitable bearings 19 on shafts 20 set into case 16. Spur gears 21 on the peripheries of the rotors mesh with one another, and by inspection, it will be seen that the rotors are arranged so that their eccentric weights 22 all move longitudinally of bar 10 in synchronism, so that unbalanced longitudinal components of force are additive, but with alternate rotors turning in opposite directions, so as to cancel transverse force components.

The spur gear 21 on the upper rotor is driven by spur gear 24 on the cross shaft 25 journalled at its ends in case 16, and driven in turn through bevel gear 26 meshing with bevel gear 27 on an axial shaft 28 journalled in the top end of the case. Shaft 28 has a splined end portion 28a, engaged by a splined socket 29 in the end of shaft 30 of the aforementioned drive motor 14.

The case 32 of motor 14 is fastened to one end of a sleeve 33 surrounding the force generator, and coupled at its opposite end to one end of a tubular jacket 34 that surrounds bar 10 and extends toward radiator 11. The opposite end of jacket 34 is connected to one end of coupling sleeve 35, the other end of which has an internally tapered end portion 36 joined by a firm taper fit to a complementary tapered surface 37 on bar 10, the bar being of somewhat enlarged diameter beyond this taper, as at 38, within the confines of cones 12, as shown.

Screwed into a socket in the end of bar portion 38 is a plug 39 supporting an end cap 40, which furnishes a stud mounting for the inwardly turned end portion 41 of a cone mounting sleeve 42 annularly spaced around bar portion 38 and supported therefrom by ribs 43. The cones 12 are furnished with inner flanges 44 which are welded to sleeve 42. At their peripheries, the cones 12 contact one another, and are suitably connected together, as by welding. The outer rims of these cones 12 are preferably furnished with turned stiffening flanges 46.

As described in the introductory paragraphs hereto, the sound radiator constituted by cones 12 has an effective diameter preferably of the order of a wavelength of sound in the liquid medium in which the apparatus is to operate. For water, this diameter dimension is accordingly, for a frequency of 400 cycles per second, about 12 feet. The bar 10, calculated on the basis of the speed of sound in steel, for a frequency of 400 cycles per second, has a length of about 10 feet.

The apparatus is immersed in a body of liquid, in any one of a number of situations, some of which will be particularized hereinafter, so that radiator 11 is liquid loaded, and when caused to vibrate effectively in contact with the liquid, radiates a sound wave therefrom.

The electric drive motor drives the shaft of the force generator, causing rotation of the unbalanced rotors; and the longitudinal components of the cyclic reactive forces of these rotors are transmitted through the rotor shafts to the generator case, where they are additive to generate a longitudinal cyclic force on the generator case, which is in turn applied to the end of bar 10. The case of the force generator, and the end portion of bar 10, being at a velocity antinode V of the bar, vibrate longitudinally of the axis of the bar, and the impedance at the coupling point between generator case and bar is elevated substantially over that of the combination of unbalanced rotors, but materially less than that of the liquid loaded radiator 11. The velocity node of the bar locates itself at V', close to the radiator 11, and the distance between V and V' is a quarter-wavelength. At the sound radiator extremity of the bar is a fairly high impedance point, where the velocity cycle is of relatively small amplitude, and the stress cycle is of relatively high amplitude. The radiator 11 is connected to the bar 10 at this high impedance point and is driven with a corresponding impedance characteristic. This high impedance is well adjusted to the loaded impedance of the radiator 11.

The bar 10 is made short enough, e.g., 10 feet in the present case, so that if removed from the system, it would have a resonant frequency, as a free-free half-wave bar, substantially greater than the illustrative system frequency of 400 cycles per second. Assuming for example, a velocity of sound in the bar of 16,000 feet per second, a wavelength becomes 40 feet, a half-wave bar would have a length of 20 feet, and a ten foot bar would have a resonant frequency of 800 cycles per second (if removed from the system). Incorporated in the system, with certain lumped mass effectively contributed by the generator case and radiator, the effective length of the quarter-wavelength bar becomes somewhat longer, typically by an amount equal to 5–10% of a quarter-wavelength, as mentioned earlier. The capacitance of this relatively short bar, only a little greater in length than a quarter-wavelength, cooperates with the mass of the system to work at the lower, designed resonant operating frequency, in this case 400 cycles. At this frequency, the capacitative reactance of the bar, for one thing, tunes out the inductive blocking impedance of the generator case, and additionally, establishes for the system a good power factor, all as explained hereinabove.

An advantage of the apparatus of FIGS. 1 and 2 is particularly to be noted, in that whereas the force generator must undergo vibration with the bar 10, the splined connection between the motor shaft and the force generator shaft permits the motor to remain stationary in space, supported by the jacket 34, which is also stationary by virtue of being connected to the bar 10 at a node of the latter.

The drive motor for the force generator has been described as preferably an induction motor. By using an induction motor with substantial armature "slip" in its rotating field, the driving force exerted thereby on the force generator is readily held at a magnitude less than the threshold value where the frequency generated by the force generator breaks over the peak of resonance, as more fully explained in my application Serial No. 825,117. This is a feature of marked advantage, giving the system very good frequency stability. Alternative expedients within the scope of the invention are available to assure this frequency stability. For example, there can be a torque-responsive engine-generator combination for supplying electric power to the driving motor for the force generator, which driving motor need not be in such instance an induction motor. Under such conditions the torque responsiveness of the engine substitutes for the torque responsiveness of the induction motor, so that the motor generator can be closely coupled, or non-slip, in nature. An important feature of my force generator-resonator combination is that such frequency stability greatly adds to the controllability of a remotely controlled servo-governor.

It might here be mentioned that it is advantageous in all cases to fabricate the radiator structure of stiff plate or cone members forming an assembly having its first resonant frequency above the resonant frequency of the resonant bar structure. This keeps the radiator structure from "flapping" owing to resonant frequencies equal to or below the operating frequency of the system.

FIGS. 4 and 5 show a modified resonant bar structure, and modified mounting of the periodic force generator and drive motor. A cone type sound radiator of the type of that of FIG. 1 is shown at 50. A force generator is shown at 51, and an electric drive motor at 52, the modified resonant bar structure being designated generally at D.

The force generator is of the type of that shown in FIGS. 1–3, having case 53 bolted at 54 to the bar structure, unbalanced rotors 55 geared together by gears 56 and driven through gears 57, 58 and 59 from motor shaft 60, the motor case 61 being in this instance screwed into the end of the generator case, as shown.

The elastic capacitative bar structure D in this instance comprises a plurality of elastic cylindrical rods or tubes 64, integrally joined into a single head 66 which is bolted at 54 to the force generator case.

The rods 64 diverge from head 66 at a typical angle as shown, and their extremities are furnished with mounting plates 69 bolted to the rearward side of the radiator assembly in the region of the line of inertia thereof. These may be two diametrically opposite rods 64, or four, as here shown, or a greater number. In fact, there may be sufficient of such rods to form a full cone, or an integral cone may be used. Of course, the more rods, the less will be their individual cross-sectional areas.

The apparatus of FIGS. 4 and 5 operates with a velocity antinode at V, a velocity node in each rod 64 at V', relatively close spaced to the radiator, and a region of high impedance at the junctions of each rod with the radiator. The standing wave patterns in the rods 64 are alike, and of course similar to those in the bar 10 of the embodiment of FIGS. 1–3. The bars are dimensioned to be capacitative in effect, giving advantages previously described. The particular advantage of the bar structure of FIGS. 4 and 5 is the location of the point of radiator drive well out on the cone assembly where the drive effort results in minimum bending of the latter.

Figure 6:
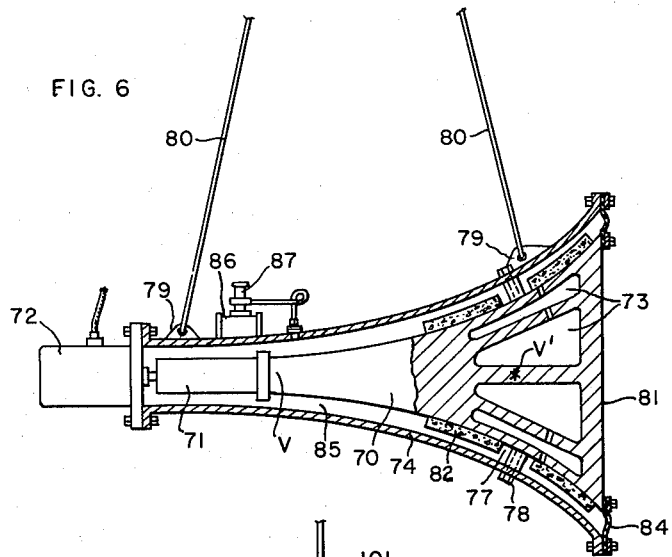
FIG. 6 shows another modification of FIG. 1.

In FIG. 6 is shown a modified form of the invention in which the resonant bar structure 70 is flared out at one end to constitute the sound radiator. To the small end of the bar structure 70 is bolted the case of the periodic force generator 71 (which may be like that of FIGS. 1–3), whose drive shaft is driven from the drive shaft of electric motor 72, all in an arrangement generally like that of FIGS. 1–3. The bar structure 70 is flared from its small end in the general form of an exponential horn. It may be a casting of a material such as anodized aluminum, and may be cast with cavities 73 for lightness. A horn-like shell 74, configured to the general outline of the bar structure 70, surrounds the sides of the bar structure with clearance, and encloses force generator 71, being bolted to the case of motor 72, and to the bar structure in the plane of the velocity node V' of the latter, as by means of spacing webs 77 and screws 78. The shell 74 is here shown as formed with eyes 79 to which supporting cables 80 may be conveniently connected. In resonant operation, a velocity antinode V appears at the small end of the bar structure, and a region of high impedance appears at the front radiating face 81 of the bar structure. The mechanical impedance characteristics are similar to those of the previously described embodiments as is the capacitative effect of the elastic flared structure 70.

Operation is the same as that of the embodiments of FIGS. 1–5, with the exception that the exponential shape tends to make the acoustic structure more unidirectional as regards the sound wave radiation pattern.

To improve the unidirectional wave radiation quality, provisions may be made for decoupling the back side of the horn-shaped bar structure, so that substantially only the front face 81 is acoustically coupled to the liquid, and thus so that radiation is primarily out from, and along the axis of, the main radiating surface 81. To this end, I coat the back surface of the flared portion of the bar structure with a layer 82 of cellular elastomer such as cellular rubber. This material tends to compress and expand in step with vibration of the bar structure, and effectively prevents back sound wave radiation. Various decoupling provisions for a similar purpose were disclosed in my Patent No. 2,717,763.

At greater depths, the cellular material tends to become collapsed, and a more positive decoupling means is required if a monopole radiation pattern is to be achieved. In such case, an annular flexible diaphragm 84 is fastened to the periphery of the front face 81 of the flared bar structure and to the periphery of the horn-shaped shell 74, so as to form a closed gas space 85 between the back of the flared bar structure and the shell. The jacket or shell 74 is substantially stationary, being connected to the resonant bar structure 70 at a node of the latter. This expedient effectively decouples the back side of the bar structure 70 from the liquid outside. To assure that the diaphragm 84 will not be subject to an appreciable pressure differential, a conventional diver's gas storage bottle 86, with a conventional aqua-lung pressure regulator 87, feeds gas to the space inside the shell or jacket, at a pressure equal to that of the submergence pressure.

Figure 7:
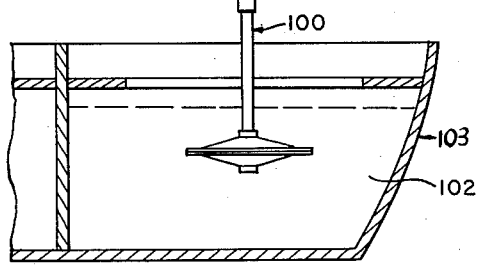
FIG. 7 shows an apparatus in accordance with the invention in combination with a liquid body in a tank.

In FIG. 7 I have shown a sound wave radiation apparatus 100 in accordance with the invention submerged by a cable 101 in a liquid body 102 contained in a tank 103, which may, for example, be a tank section, in a tanker ship. This operates to radiate powerful sound waves in the liquid body. This apparatus is capable of removing solid foreign material which has accumulated on and adhered to the inside surface of the tank. Moreover, the apparatus is especially effective for mixing the contents, and preventing settling out of solids. The apparatus can be permanently installed in an ocean liner or other tank, as well as being inserted occasionally for short duration processing. In the case of ship's tanks, the invention used as illustrated is especially effective because of its high power. And because of its moderate frequency, sonic energy loss through the hull is minimized.

Figure 8:
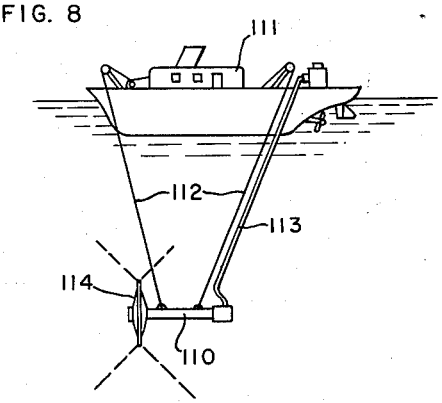
FIG. 8 shows an apparatus in accordance with the invention supported in the ocean from a ship.
Figure 14:
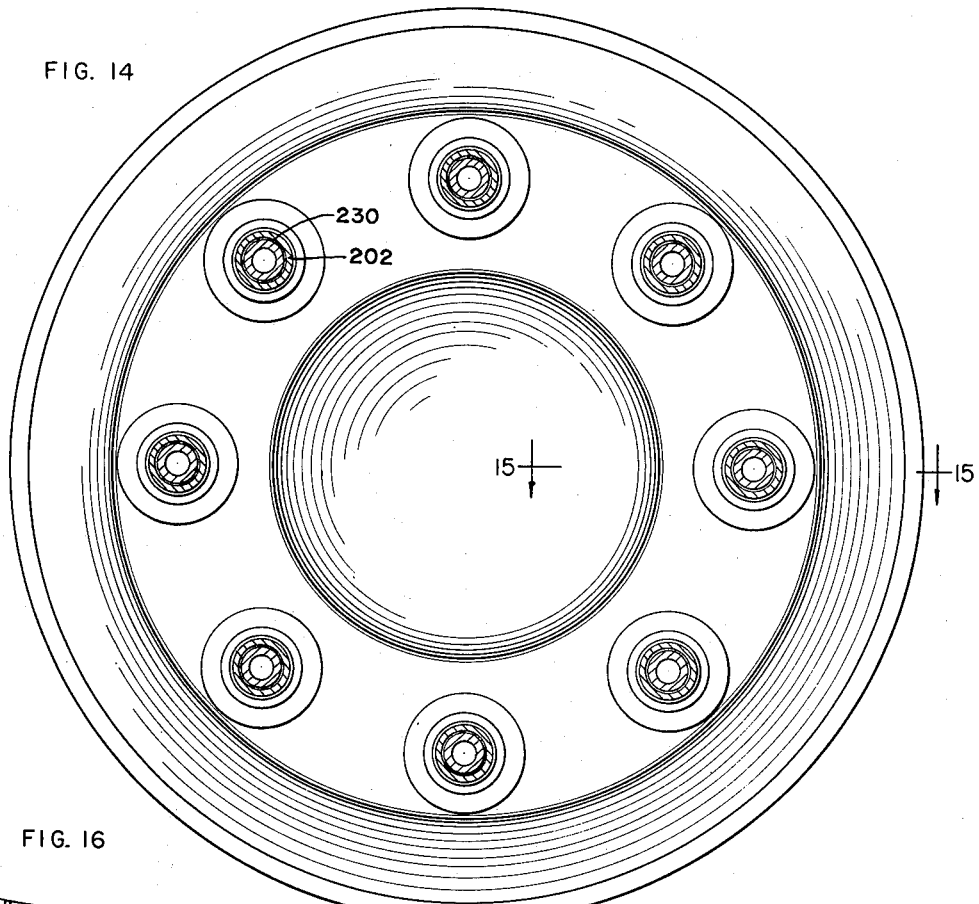
FIG. 14 is a vertical section taken on line 14—14 of FIG. 13.
Figure 16:
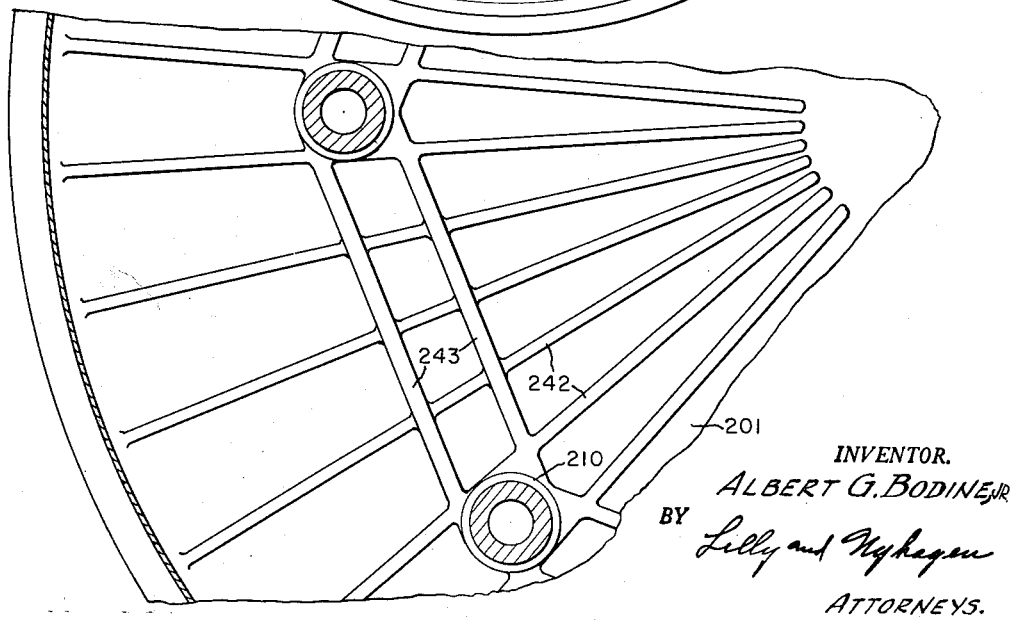
FIG. 16 is a view taken in accordance with line 16—16 of FIG. 15.

FIG. 8 shows my sound wave radiator apparatus 110 in combination with an ocean vessel 111, for locating the position and orientation of the sound radiator in the water. Here the apparatus is suspended by cables 112 from conventional boom facilities on the vessel. The electric power source may also be located on the ship, and power fed to the apparatus by cable 113. The dashed lines P in the figure represent the sound radiation pattern if a simple form of my invention be used, giving radiation from the back as well as the front of the radiator 114. This is a dipole acoustic pattern, which places the vessel advantageously in a null region, and which is of advantage for establishing a standing wave pattern between a plurality of such ships.

FIG. 9 shows a monopole version of resonator-radiator in accordance with the invention, giving a radiation pattern primarily in one direction only. It illustrates an anchored buoy 120 for supporting the resonator-radiator 121 of the invention through cables 120a. Here, the power source may be on land, with an electric cable run out to the buoy, and thence, as at 122, down to the motor of the apparatus 121. Using a single power source on land to feed a number of such units, the operation thereof can be conveniently correlated as regards frequency and/or phase. As an alternative, the buoy may accommodate a conventional engine-generator 125 within it, supplying electric power for the electric motor of the apparatus. Here, additional governing means 126, of conventional type, can be radio controlled through antenna 127 and conventional sensor 128 to govern the speed of the engine, and therefore the frequency of the radiated wave.

It should be understood that a plurality of my resonator-radiator units can be closely spaced, so as to produce a beam, as taught in my Patent No. 2,745,507.

FIG. 10 shows another embodiment of the invention, which is exactly like that of FIGS. 1–3, excepting for the addition of a resonator shell or cavity S to the sound-wave radiator. The primary purpose is unidirectional radiation, it being evident that the embodiment of FIGS. 1–3 radiates in two opposite directions. The embodiment of FIG. 10 has some additional advantages as will appear.

For simplicity, parts of the embodiment of FIG. 10 corresponding to that of FIG. 1 are identified by the same reference numerals, but with the suffix a added in the case of FIG. 10. With this understanding, the shell S includes a cylinder 140 which surrounds the periphery of radiator 11a, and extends rearwardly therefrom a quarter wave length distance $\lambda/4$ in the water for the resonant operating frequency. The back of this cylinder is closed by a rearward sound wave reflector wall 141, substantially parallel to the rear wall of the radiator. Thus, in this illustrative case, the wall 141 is in the form of a flat cone. The cone is internally braced by webs 142, and it is mounted on the front end of a sleeve 143 annularly spaced around jacket 43a, and welded thereto, as indicated. External bracing webs 145 contribute rigidity to the assembly. It will be recalled that jacket 43a is connected to the node of the bar, and hence approaches almost infinite impedance. In other words the jacket 43a is supported very solidly at this point. The sleeve 143 which serves to support the resonator assembly, being connected to this solidly supported jacket, thus offers a good, solid support for the resonator assembly and acts to minimize vibration thereof.

In the operation of the embodiment of FIG. 10, the radiator 10 vibrates as indicated by the doubleheaded arrow in the general manner of the embodiment of FIGS. 1–3. Radiation occurs from the front face of the radiator, as in FIGS. 1–3. Radiation from the back face of the radiator, however, is cancelled by the quarter-wave resonator cavity, which creates a velocity antinode in the liquid adjacent said back face, and a velocity node adjacent the back wall 141 of the resonator cavity. Substantial pressure variations occur at the velocity node, but velocity variations are minimized, little vibration of the fairly solidly supported resonator assembly takes place, and correspondingly little back radiation occurs from the external resonator wall 141. There will of course be some radiation in the backward direction owing to diffraction, and owing to the fact that the back wall of the resonator cavity cannot in practice be so solidly supported as to withstand entirely the large pressure variations at the node there-adjacent. As noted hereinabove, however, attention has been given to solid support of the resonator wall 141; and in overall accomplishment, radiation is very predominantly unidirectional.

An important advantage of the resonator cavity of FIG. 10 is that it "tunes out" the mass (inductive) reactance of the water "riding" on the radiator. As touched upon hereinabove, the equivalent mass of the water moving bodily with the radiator creates an inductive reactance which opposes movement of the radiator. Specifically, it opposes the force of the force-generator, reducing the stroke amplitude of the radiator, and limiting the ability to deliver sonic energy to the water. This mass loading of the radiator by the water is the reason the velocity node in the elastically vibratory bar is located so near to the radiator. In the system of FIG. 10, however, the resonator cavity coupled into the system tunes out the mass loading reactance, so that the impedance presented by the water to the radiator is greatly reduced. Such reduction in impedance tends, in turn, to move the node V' in the bar somewhat further from the radiating plate. This permits the plate to deliver substantially more sonic energy to the water.

FIG. 11 shows a further embodiment exactly like that of FIGS. 1–3, excepting for the addition of a wave absorber A to eliminate radiation from the back of the radiator. Parts in FIG. 11 corresponding to those in FIGS. 1–3 are identified by the same reference numerals, but with the suffix b added in the case of FIG. 11.

The wave absorber A comprises an exponential horn 150, designed to accept the wavelength radiated by the radiator 11b, mounted around the resonant bar 10b, with its large end preferably of just slightly larger diameter than the radiator, and spaced a short distance back of the rearward wall 12b of the radiator. The small end of the horn is at a relatively narrow annular spacing from jacket sleeve 33b; and the horn is braced from jacket sleeve 34b by means of longitudinal webs 151 extending from said sleeve 34b. A sound absorber means 152 is placed in the convergent portion of the horn. In this instance, it comprises an annular body 153 of suitable sound absorbing material, such as stainless steel wool, confined against the wall of the horn by a perforated wall 154.

The exponential horn 150, with its acceptance design characteristic for waves of the frequency radiated from the radiator, transmits such waves freely down the horn, without substantial reflection. Because of the progressively decreasing cross section of the horn, the energy density of the wave increases as it moves down the horn. By the time the wave reaches the sound absorber means, the energy within the confines of the sound absorber is quite high; and because of the high energy density, it is possible to attenuate a large quantity of sonic energy with the use of a relatively small quantity of sound absorbing material.

FIG. 12 shows a further embodiment of the invention, generally like that of FIGS. 1–3 excepting for addition of a wave turning means whereby radiation from both the front and back of the radiator is transmitted unidirectionally. Parts in FIG. 12 corresponding to parts in FIGS. 1–3 are identified by the same reference numerals, but with the suffix c added in FIG. 12.

The device has cyclic force generator 13c, motor 14c, elastically vibratory bar 10c, and radiator 11c having front and rear walls 12c, all in the general arrangement of earlier embodiments. FIG. 12, however, in connection with later considered FIGS. 22 to 26, illustrates a hydraulic form of cyclic force generator.

A wall assembly 156 to the rear of the radiator defines a plurality of concentric annular folded passages or ducts having entrance ends facing and immediately adjacent the rearward radiator wall, and discharge ends in the plane of the forward radiator plate. These passages are of different lengths, but are all an odd number of half wavelengths in length. Thus, an annular passage or duct 160 leads rearwardly from a peripheral region of the back side of the radiator, thence turns radially outward, and finally forward, to terminate in the general plane of the front side of the radiator. This duct is defined by a short cylindrical wall 161 extending rearwardly from the rim of the radiator, and an annular wall 162 having inner and outer cylindrical wall portions 163 and 164, respectively, and a return bend portion 164'. The wall 162 is arranged so as to receive the wall 161 between its two portions 163 and 164, and so as to define the aforementioned duct 160, as will be clear from the drawings. The length of the duct 160 may be, for example, one-half wavelength.

Around the outside of duct 160 is a longer duct 165, in this case three-halves wavelength. An annular wall 166, like wall 162, and spaced outside the latter, cooperates with wall 162 and with a dummy baffle 167 to define the duct 165. The dummy baffle 167 is used simply to obtain the necessary length of passage across a large share of the cross section. The wall 166 is secured to wall 162 and baffle 167 by spacer webs 168 and 169.

Finally, in the illustrative design, a five-halves wavelength duct 170 is provided, extending between the inner area of the rearward side of the radiator, around the first two ducts, and terminating in the front plane of the radiator. This duct 170 is defined on the outside by a cylindrical wall 171, spared from and mounted on the outside of wall 166 by webs 172. The rearward end portion of wall 171 curves inwardly and merges with a rearward wall 173, which is mounted on a sleeve 174 surrounding and tightly mounted on jacket sleeve 34c, and is braced thereto by webs 175. A dummy baffle 176, similar to baffle 167, and mounted on the outside of wall 166, as well as connected to wall 173 by webs 177, adjusts the length of the duct 170 to the five-halves wavelength desired.

The ducts 160, 165 and 170 thus all originate at the rearward side of the radiator, and discharge in the plane of the forward side of the radiator. Their lengths being add multiples of a half-wave length, it will be seen that the waves leaving these ducts, in the plane of the front side of the radiator, are in phase with the waves radiated from the front side of the radiator. Hence the sonic wave energy from both sides of the radiator is directed in a forward beam.

FIGS. 13 to 21 show a sonic radiator machine embodying a special form of my invention, incorporating the same basic principles of the earlier described embodiments, and conceived particularly for applications requiring especially high power, providing maximum flexibility of design parameters, and containing a number of advantageous novel features as will appear.

The machine includes, generally speaking, a radiator 200 preferably embodying a generally circular radiator plate 201, and for transmission of vibratory drive thereto, a plurality of parallel longitudinally elastic vibratory bars 202, in this case in the form of hollow shafts, disposed at right angles to the radiator and engaging at one end against the radiator plate. Preferably, and in the present instance, these bars are in a cylindrical array about the longitudinal axis O—O' of the machine, equally spaced from one another, and engage the plate at equal radii of the latter, about two-thirds of the way from the center of the plate to its periphery. More precisely, the bars engage the radiator plate at the node of the fundamental resonant frequency for vibration in a transverse (bowing) mode. There is then no tendency for the bars to generate this bowing mode of vibration in the radiator plate. Eight such bars are used in the present embodiment. In this way, the vibratory drive effort against the radiator plate is applied in a distributed uniform pattern, and tendency toward transverse bending of the plate, as when it is driven from its center, is greatly reduced. At the other ends of the bars is a motor and force generator assembly or power unit 203, contained in a relatively flat and generally cylindrical enclosure 204. Inside of the latter is a set of individual cyclic force generators 205, of a unique type, which engage the ends of the bars 202, and are adapted to set up synchronous longitudinal standing wave vibration in the bars.

The generators 205 are driven through later described gearing from individual electric motors 206 (FIG. 17), preferably induction motors, arranged with their axes radiating from the center axis of the device like the spokes of a wheel. The inner ends of the shafts of these motors 206 are geared together (FIG. 18) by gearing 207 to obtain force-generator synchronism. The motors are fed with electric power by means of a cable 208 passing through the enclosure 204. The entire machine may be suspended by means of suitable lines secured to support rings 209 secured to jacket 213 and enclosure 204, or in any other manner. With further regard to the motors, they are designed to conform to the requirements set forth earlier herein, i.e., so as to deliver drive efforts to the cyclic force generators such as will take the cyclic force generators near to but less than the frequency for peak amplitude resonance of the system.

Considering the structural components mentioned above in more detail, the resonant bars 202, seen best in FIG. 15, are in this instance hollow steel shafts. Their end portions, at their radiator ends, pass through tubular bosses 210 cast on the inner sides of radiator plate 201 and the bores of which open through the plate, as shown. The extremities of the bars are enlarged and screw-threaded, beyond plate 201, to receive cap nuts 211 which are set up tightly, through suitable washers, against the plate. Just beyond the ends of bosses 210, the bars or shafts 202 have shoulders 212 which, when nuts 211 are tightened, are set tightly against the ends of the bosses through washers 212a.

A closed jacket structure, generally designated by the numeral 213, surrounds the bars from the radiator plate 210 to the velocity node regions V' of the bars, and encloses also the entire rearward side of the radiator plate 201. This jacket structure includes a shallow pan 214 surrounding the rearward side of the radiator plate, and of slightly greater diameter than the latter. This pan 214 has a short cylindrical side portion 215 whose forward edge is coplanar with the forward face of the plate 201, and welded to this forward edge is an outwardly extending annular flange 216. A flexible ring 217 connects the face of the flange 216 and the periphery of plate 201. This ring 217 seals the interior cavity of the pan 214 from outside water, and also permits relative movement between radiator plate 201 and the pan. Another annular flange 218 is here shown as mounted on the wall 215 at its rearward end, and is used to contribute rigidity to the structure.

Each bar 212 has at its velocity node V' a cylindrically enlarged section 220 which is received in a corresponding recess formed inside externally tapered resilient rubber bushing 223. The bushing 223 is received inside oppositely tapered bore 224 in externally cylindrical wall 225 of mounting fixture 226.

The fixture 226 has a shoulder 227 abutting the small end of tapered bushing 223, and has also a reduced, internally taper-threaded socket 228 to receive the taper-threaded male coupling 229 on the end of the housing sleeve 230 for the bar 202.

The aforementioned pan 214 has a rear wall 231 formed with a central aperture 232 in which is received a cylindrical projection 233 on the forward end of fixture 226, the fixture being sealed and made rigid with the pan 214 by means of an external flange 234 welded to pan wall 231. A clamping annulus 236 has a flange 237 through which pass clamping studs 238 engaging threaded sockets in member 233, and has an annular seat 239 engaging against the opposed end of rubber bushing 223. It will immediately be seen that the tightening of studs 238 draws the taper-bored fixture 226 forwardly on the tapered rubber bushing 233, and so tightens the clamping assembly, as well as the jacket structure 213, to the stationary nodal portion of the resonant bar 202.

To prevent leakage of water into the jacket 213 when the machine is immersed, air at a pressure suitably above anticipated exterior hydrostatic pressure is piped thereto through a hose 240, as indicated in FIG. 13.

The radiator plate 201 is preferably stiffened (FIG. 15) by means of radial ribs 242, some of which intersect and brace bosses 210, and further parallel ribs 243 extending between the bosses.

The enclosure 204 for the force generator and motor assembly 203 comprises a base or frame plate 245, parallel to radiator plate 201, and therefore at right angles to bars 202, and a shallow cover 246. Plate 245 has apertures 247 axially aligned with bars 202, and receiving the corresponding end portions thereof, the extremities of the bars being engaged by the base flanges 248 of the force generators 205, and fastened thereto as by studs 249 and nuts 250.

The jacket tubes 230 surrounding the bars 202 have externally taper-threaded coupling ends engageable in correspondingly threaded sockets in the ends of sleeves 252 formed with flanges 253 abutting and welded to plate 245 around apertures 247. Bushings 254 fitted tightly into sleeves 252 afford bearing for the longitudinally vibratory bars or shafts 202. To prevent leakage of water inside the power unit 203, the power unit cover 204, like the radiator jacket 213, is supplied with air under a pressure above hydrostatic through an air hose 255.

Figure 17:
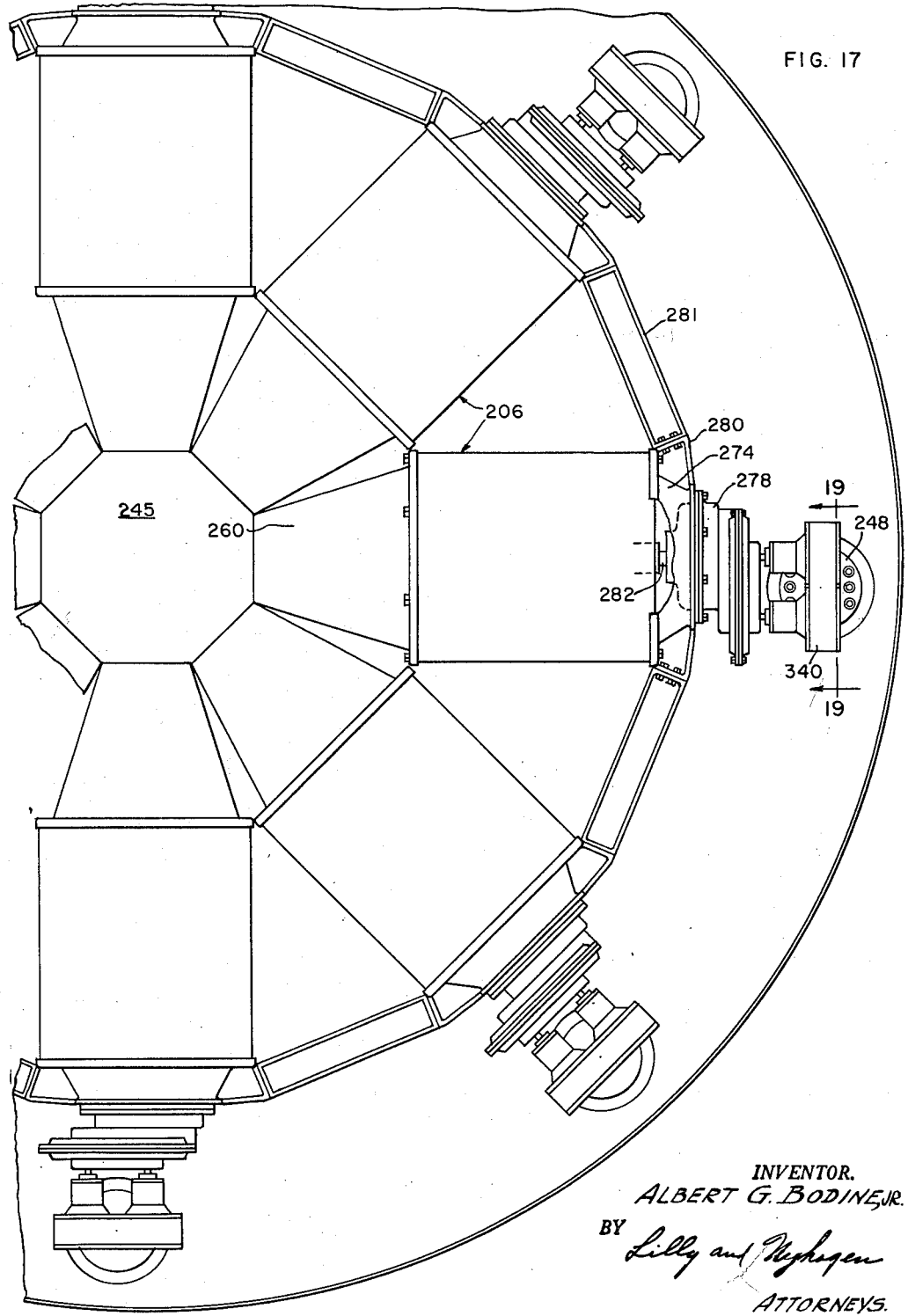
FIG. 17 is a section taken in accordance with line 17—17 of FIG. 13.

With reference now particularly to FIGS. 17, 18 and 21, each of the eight motors 206, dispersed radially of the central axis O—O' of the machine, has fitted to the radially inward end of its housing a conical extension 260, supported in any suitable way (not shown) from frame plate 245. The small end of this extension 260 supports a bearing unit 261 for the hollow shaft 262 of a bevel gear 263. The gears 263 corresponding to the entire set of radially disposed motors 206 are in mesh with one another in a circular series.

Splined, as at 270, inside gear shaft 262, is one end of a motor extension shaft 271, the other end of which is coupled to the shaft of motor 206.

To the radially outward ends of the housing of motors 206 are secured conical housing extensions 274, the small ends of which have inwardly extending flanges 275 (FIG. 21) to which are secured the peripheral flange portions 276 and 277 of multiplying and reversing gear case 278 (FIGS. 15, 17 and 21), to be described later.

Motor housing extensions 274 include brackets 280 at the sides thereof (FIGS. 15 and 17), to which are secured bracing frames 281 which bridge the space between the radially outward ends of the motors 206. The frames 281 may be supported in any suitable manner, not shown, from base plate 245.

The outer extremity 282 of each motor shaft (FIGS. 17 and 21) is bored to receive one end of a short coupling shaft 283, which is splined within shaft 282, as at 284. The other end of shaft 283 drives the multiplying and reverse gearing inside of gear case 278. This gearing, which will next be described, has two purposes. First, assuming the desire to use commercial motors operating at a few thousand r.p.m., but to generate a substantially higher sonic frequency, this gearing introduces the desired cyclic multiplication. Second, the force generators used, and presently to be described, require two drive shafts turning in opposite directions, and the present gearing incorporates two such output shafts for this purpose.

Gear case 278 is in three parts, 285, 286 and 287, the first two of which carry the parting plane flanges 276 and 277. These flanges clamp between them a mounting flange 290 on the outside of an internal ring gear 291.

Meshing with internal gear 291 are a plurality of planet gears 292, e.g. four in number. These gears 292 have hubs 293 projecting oppositely therefrom, and seating the inner race rings of roller bearings 294, the outer race rings of which are seated in recesses 295 formed in flanges 296 extending outwardly from tubular members 297 and 298 on the two sides of gears 292.

The end of casing part 285 has a tubular boss 300 in which is seated a bearing 301 for the outside of tubular member 297; and the aforementioned coupling shaft 283 reaches inside tubular member 297, and is splined thereto as at 302.

The other tubular member 298 is externally supported by a bearing 303 seated in a recess 304 in casing part 286. Gears 292 all mesh with an axial gear 310 formed on an axially disposed shaft 311, this shaft being supported by bearings 312 and 313 seated inside tubular members 297 and 298, respectively.

It will be seen that rotation of tubular member 297 by motor coupling shaft 283 causes the gears 292 to planetate, and to turn on their axes by reason of their engagement with internal ring gear 291. In addition, the planetating and rotating gears 292 drive the much smaller gear 310 on the shaft 311. It will be evident that considerable step up in shaft speed is thus obtained.

The end of shaft 300 remote from shaft 283 is bored out and received and splined therein, as at 315, is one end of a shaft 316, the other end of which is splined, as at 317, within a hollow hub 318 on one side of a gear 319. The gear 319 will be seen to be located on the parting plane between gear case parts 286 and 287, and to be received in suitable cavities therein. Gear 319 has, projecting oppositely from hub 318, a hub or sleeve 320 which terminates flush with the end face of casing part 287, as shown. The two hubs 318 and 320 turn in bearings set into casing parts 286 and 287, as illustrated.

Gear 319 meshes with reverse gear 330, which is exactly like gear 319, and is supported similarly thereto.

Gears 319 and 330 drive two parallel shafts 331 and 332 in reverse directions at the same speed, these shafts being the drive shafts for the cyclic force generator presently to be described. The shaft 331 is splined, as at 333, within gear hub or sleeve 320, and shaft 332 will be understood to be similarly splined within the corresponding gear hub or sleeve on the reverse gear 330.

The previously mentioned cyclic force generator 205 will next be described, reference being directed to FIGS. 15, 19, 20 and 21. The base flange 248 of each generator 205 is circular, and well secured to the end of the corresponding resonant vibratory bar or shaft 202. Extending transversely across and rearward from this base flange is a heavy base plate 340, preferably formed integrally with the base flange, and provided with plane, parallel sides. This plate 340 is in a plane at right angles to the two parallel drive shafts 331 and 332, and it is formed with transverse circular bores 341 in axial alignment with these drive shafts.

Hubs 342, coaxial with bores 341, are fitted to the side of plate 340 facing the gear case 273, and hold bushings 343 and 344 (FIG. 20) for rotatable crank shafts 346 having, within the bores 341 of plate 340, crank pins 347. The hubs 342 are secured to plate 340 by means of screws 348 and nuts 349, and these fastening means also secure, against the opposite side of plate 340, cover plates 350 for the opposite ends of bores 341.

Crank shafts 346 have bores 352 which receive the two oppositely rotatable drive shafts 331 and 332, respectively. The shafts 331 and 332 are splined within shafts 346, as indicated at 353. The splined couplings at the two ends of each of shafts 331 and 332 between the drive motors 206 and force generators 205 accommodate a rocking action of said shafts which in turn serves to isolate the motor effectively from the vibration of the force generators. It will also be seen that the drive motors 206 are supported by mounting structure which, by virtue of the connection of said structure to the velocity node region V' of the elastic rods 202, and also by reason of the resilient bushing 223 (FIG. 15) is connected to but acoustically isolated from said rods.

The hubs 342 and cover plates 350 are formed to project a short distance inside bores 341, and to have plane inner surfaces, so as to define cylindric raceways 360 for orbital masses in the form of cylindrical inertia rings 361. These rings are of substantially less diameter than the diameter of the raceways, and they are designed to roll around the raceways. Each ring 361 surrounds the corresponding crank pin 347 with considerable clearance, as indicated best in FIG. 20, and is rolled around the raceway by said crank pin. To reduce rolling friction between the crank pin 347 and the inside surface of the ring 361, an anti-friction roller 362 is mounted in the crank pin, as shown best in FIG. 20. The roller 362 in engagement with the inside of ring 361 holds the outside of the ring against race 360. However, the ring is made slightly less in thickness than the radial distance between the roller 362 and the race 360 so that the crank pin, when turning, causes the roller 362 to engage the ring 361 on a line slightly in advance of the conact line where the rolling ring is in contact with the outside race 360. In effect, the crank pin rolls the ring 361 around the race 360.

In so rolling around the races 360, of course, the two rings 361 exert centrifugal forces, in opposite directions of rotation, on the two races 360, and on the frame plate 340 and base flange 248 of the generator. Because the crank pins are driven in reverse directions, and because they are, at time of installation, phased so as to move in the direction longitudinally of the resonant bars 202 in unison (FIG. 19), the inertia rings 361 move in the direction of the bars 202 in unison, but move in directions transversely thereto in phase opposition to one another. Accordingly, components of cyclic shaking force are applied to the force generator frame parts 340 and 248, and thence to bars 202, in directions longitudinally of the latter; but components of force in transverse directions are cancelled.

It will also be understood that all force generators are synchronized, so that the longitudinal cyclic forces applied to the bars are synchronous.

The design of the entire power unit is of course made such that the cyclic force applied to the ends of the bars 202 is a resonant frequency of the bars for a mode of standing wave vibration thereof. In this case half-wave standing wave vibration is preferred and assumed. In accordance with principles discussed earlier, the velocity node of such standing wave appears at V' (FIG. 15) near the radiator. Velocity antinodes V appear at the ends of the bars, as indicated.

The entire operation should be evident from the above detailed description, and from the basic underlying principles of the invention discussed in the introduction, also in connection with FIGS. 1–4, and which apply here equally, and need not be repeated in detail.

Very briefly, the several motors, through the step-up and reverse gearing, drive the several force generators in unison. These generators set up synchronous resonant standing wave vibration in the bars 202; and the extremities of the bars 202 drive the radiator with a bodily motion, normal to its face. The vibratory driving forces transmitted by the bars are all normal to the radiator, so that there are no lateral stresses involved.

The drive of the plate by a plurality of bars is a unique concept. By applying these bars to the radiator, normally thereto, and well out from the center, preferably at the node of the fundamental resonant frequency of the radiator for transverse vibration, maximum stability against transverse vibratory bending of the radiator is assured.

By using a plurality of driving bars, operating in synchronism, the power requirement of each, for a machine of given power rating, is reduced, and while a number of force generators are required, they can be smaller, and the entire apparatus can be of reduced over-all scale. On the other hand, by using a plurality of force generators of substantial scale, a very powerful machine is attained.

FIGS. 22–26 show a hydraulic form of cyclic force generator which may be used in any of the embodiments of my invention. It is herein illustrated in particular in the embodiment of FIG. 12, to which reference is also directed.

Electric motor 14c has a drive shaft 400 which is bored at its output end, and received and splined therein, as at 401, is the extremity of a rotor shaft 402. Secured to the motor case is jacket 34c (see FIG. 12).

The elastic bar 10c (FIG. 12) has in its driven end a taper threaded socket 404, in which is threaded the tapered coupling pin 405 on the lower end of the hollow cylindrical body 406 of force generator 13c. This body has a lower end wall 407, a side wall 408 having a cylindrical bore 409, and threaded into the upper end of the body is an upper wall 410 having a tubular upper extension 412 carrying a packing gland 413 for rotor shaft 402.

Formed on shaft 402 between walls 407 and 410 is a cylindrical rotor body 415, and below said body is a lower extension 402a of the rotor shaft. This extension 402a is rotatably and slidably received in a bore 416 drilled downwardly into the lower end wall 407 of the body 406, and is longitudinally grooved to form liquid passages 418 leading to the inner end portion of bore 416, so as to avoid liquid trapping.

The cylindrical rotor 415 has formed in its sides two pairs of grooves, a pair 420, 421 in opposite sides thereof, cut deep into and through the lower end of the rotor and tapering out toward the top thereof, and, at 90° spacing from grooves 420, 421, a second pair of grooves 422, 423 cut deeply into and through the top end of the rotor, and tapering out toward the bottom thereof. Fitted for free longitudinal sliding movement in bore 409, and surrounding rotor 415, is a sleeve 425 having an elliptical bore 426. This sleeve has formed in its outside surface a vertical guide groove 427, which receives and is guided vertically by a guide element 428 secured to and projecting inwardly from the wall 408 of body 406. The sleeve 425 is thus guided for limited vertical reciprocation. The cylindrical surface of the rotor is just tangent to the inside surface of the elliptical bore at the narrowed diameter of said bore, but is freely rotatable therewithin.

The elliptically bored sleeve 425 is coplanar at both ends with the ends of the rotor. Seated on and fastened to the upper and lower ends of the rotor are disks 430 and 431, whose peripheries are rotatably and slidably received in body bore 409, and which are centrally bored, as shown, to pass shaft 402 and its lower extension 402a. The upper plate 430 has apertures 433 furnishing communication between rotor grooves 422 and 423 and the space 436 between plate 430 and upper wall 410; and lower plate 431 has apertures 434 furnishing communication between rotor grooves 420 and 421 and the space 437 between plate 431 and lower wall 407.

The rotor is provided between the described side grooves therein with four 90-degree-spaced radial slots 440 (FIG. 25) slidably receiving rotor vanes 441 which, when the rotor is rotated, bear at their outer rounded edges, by centrifugal force, against the surface of elliptical bore 426. These vanes may be provided, as shown in FIG. 26, with shallow grooves 442 to permit free access of hydraulic liquid to and from the spaces behind the inner edges of the vanes. The spaces 436 and 437 and the space between the rotor and the elliptically bored sleeve 425 are filled with a suitable hydraulic liquid, preferably a light oil.

When motor is driven, the rotor is turned, and its vanes sweep about the elliptical bore, maintaining sealing engagement with the wall surface thereof. It will be seen that the four vanes define four rotating compartments, a, b, c, and d, of variable displacement, between the cylindrical rotor and the elliptical bore. In the position of the rotor seen in FIG. 25, compartments a and c are at maximum displacement volume, and compartments b and d are at minimum displacement volume. Assume the rotor to be in the position to FIG. 25. Compartments a and c, at maximum volume, will be seen to be in communication via rotor grooves 420 and 421 and apertures 434 with chamber space 437; and at the same time, compartments b and d, at minimum volume, are in communication via rotor grooves 422 and 423 and apertures 433 with chamber space 436. Now, as the rotor turns right handedly through a quarter turn, for example, compartments a and c are reduced from maximum to minimum displacement volume. The hydraulic fluid in said compartments is, during this time, expelled via rotor grooves 420 and 421 and apertures 434 to chamber space 437, where it acts to drive the entire assembly of rotor, rotor shaft, and elliptically bored sleeve, in an upward direction. At the same time, the compartments b and d are increased to maximum volume, and liquid in upper chamber 436 enters to fill the same via apertures 433 and rotor grooves 422 and 423, thus allowing the rotor assembly to rise.

During the next quarter turn of the rotor, the reverse takes place, and the rotor assembly is driven down, and so on. The rotor assembly thus reciprocates vertically in response to rotation. Owing to the mass of this reciprocating assembly, a cyclic reactive force is transmitted through the hydraulic fluid to the body 406, and thence to the elastic vibratory bar 10c, in a general manner comparable to that of the completely mechanical oscillator-mass force generators described hereinabove.

The hydraulic generator of FIGS. 22–26 has a number of advantages, including mechanical simplicity, and suitability for relatively high frequency operations.

Speaking generally of the various elastic resonant bar systems of the embodiments of my invention, the acoustic "Q" of the overall systems can readily be set at different desired levels by selection of the cross sectional area of the bar or bars. The factor "Q" is a figure of merit of vibratory systems defined technically as the ratio of energy stored in the system to energy dissipated therein per cycle. It is analogous to "flywheel effect" in rotary systems. In cases wherein it is desirable to generate relatively broad frequency band sound in the water, or for frequency modulation, a fairly low "Q" is desirable, of the order of magnitude of, say, 5. This is accomplished by use of a bar or bars of relatively large cross sectional area. If on the other hand it is desired to generate a sharp, clean wave form of narrow frequency content, it is desirable to use a relative slender bar system. This has the effect of placing the node very close to the radiator, and allows the cyclic force generator to deliver it energy without being too closely coupled acoustically to the radiator.

In the use of many of the embodiments of the invention disclosed herein, pulsing of the radiated wave can in various circumstances be desirable. For such purpose, there may be incorporated, between the force generator and resonant bar, a servo-clutch mechanism such as shown on my Patent No. 2,745,507.

The drawing and description will be understood to be merely illustrative of and not restrictive on the inventions considered in its broader aspects, and many modifications are therefore possible within the scope of the broader of the appended claims.

I claim:

1. Acoustic apparatus for radiating sound waves into a liquid body, comprising: a sound wave radiator immersible in liquid and comprising a radiation surface which has a dimension across substantially as great as a major fraction of a wavelength for the speed of sound in the liquid and at a predetermined operating frequency, an elongated elastic structure longitudinally vibratory at said predetermined operating frequency in a longitudinal standing wave pattern, said structure being drivingly coupled at one end to said radiator, so as to be loaded thereby and by the liquid in which the radiator is immersed, cyclic mechanical force generator means drivingly coupled to the opposite end of said elongated elastic structure for applying to said structure a cyclic force oriented longitudinally thereof and at substantially said predetermined operating frequency, the vibratory system comprised of said generator means, elastic longitudinally vibratory structure and liquid-immersed radiator being resonant at said predetermined operating frequency, said elongated elastic structure when vibrating at said operating frequency in said standing wave pattern having a velocity node located substantially nearer its end coupled to said radiator than to its opposite end, and having a velocity antinode at its said opposite end, motor means in combination with said cyclic force generator for driving said cyclic force generator, and supporting structure for said motor means connected to but acoustically isolated from said elongated elastic vibratory structure.

2. The subject matter of claim 1, wherein said elongated resonant structure comprises an elongated elastic bar.

3. The subject matter of claim 1, wherein said elongated resonant structure comprises a plurality of bars having a juncture for coupling to said cyclic force generator means, and extending angularly apart from said juncture to outwardly spaced coupling points on said radiator.

4. The subject matter of claim 1, wherein said resonant structure comprises a horn-shaped member whose small end is coupled to said cyclic force generator means, and whose large end is formed with said radiation surface.

5. The subject matter of claim 1, wherein said radiator comprises a cone assembly including two obtuse angle cones connected back to back.

6. The subject matter of claim 5, wherein said cone assembly has its lowest resonant frequency higher than the resonant operating frequency of said resonant structure.

7. The subject matter of claim 2, including a jacket surrounding said bar, connected at one end to said bar at the node thereof, and supporting at its other end said motor means for driving said force generator means.

8. The subject matter of claim 7, including also a splined driving connection between said motor means and said force generator means.

9. The subject matter of claim 4, including also acoustic decoupling means on the rearward side of said horn-shaped member in the form of a layer of cellular compressible material.

10. The subject matter of claim 1, including also a shell surrounding said resonant structure and a rearward side of said radiator and enclosing a gas space thereadjacent, and a flexible diaphragm joining the periphery of said radiator to said shell.

11. The subject matter of claim 10, including also means for feeding gas under pressure to said gas space within said shell.

12. The subject matter of claim 11, including also a pressure regulator for regulating the gas pressure fed to said gas space.

13. The subject matter of claim 1, wherein said elongated resonant structure comprises a plurality of substantially parallel elastic bars coupled to said radiator at spaced points thereon, said force generator means comprises a plurality of individual force generators, one drivingly coupled to each of said bars, and means for synchronizing said individual force generators.

14. The subject matter of claim 1, wherein said radiator comprises a plate, and said elongated resonant structure comprises a plurality of substantially parallel elastic bars normal to said plate and drivingly coupled thereto at points spaced about the center of said plate and located in the region of a node for fundamental frequency transverse vibration of said plate.

15. The subject matter of claim 1, wherein said radiator comprises a plate, and said elongated resonant structure comprises a plurality of elastic bars drivingly coupled to said plate, a shell to the rear of said plate supported on and sealed to said bars in the proximity of velocity nodes thereof, said shell defining a gas space to the rear of said plate, and a flexible diaphragm joining the periphery of said plate to the edge of said shell.

16. The subject matter of claim 1, together with a resonator cavity disposed to one side of said radiator so as to receive and cancel the radiation therefrom.

17. The subject matter of claim 1, together with a cavity-forming shell including a side wall portion extending rearwardly from the radiator from near the periphery of the latter, and a rearward wall portion disposed to the rear of said radiator and generally parallel thereto, the spacing of said rearward wall portion from said radiator being of the order of a quarter-wavelength in water for the resonant operating frequency of the apparatus.

18. The subject matter of claim 16, including means for supporting said resonator cavity from said elongated elastic resonant structure in the region of said velocity node in said structure.

19. The subject matter of claim 1, together with a sound wave absorber disposed opposite one side of said radiator so as to receive and dissipate the radiation therefrom.

20. The subject matter of claim 19, wherein said absorber comprises a horn whose large end faces said side of said radiator, and sound wave dissipation means in the small end portion of said horn.

21. The subject matter of claim 1, including also a plurality of ducts, each of which faces at one end toward one side of said radiator, and whose other end lies substantially in the plane of said radiator and faces in the same direction as the opposite side of said radiator, said ducts each having a length substantially equal to an odd multiple of a half-wavelength of a sound wave in water whose frequency is that of the resonant operating frequency of the apparatus.

22. The subject matter of claim 1, wherein said cyclic force generator comprises a hydraulically oscillated mass.

23. Acoustic apparatus for radiating sound waves into a liquid body, comprising: a sound wave radiator immersible in liquid and comprising a radiation surface which has a dimension across substantially as great as a major fraction of a wavelength for the speed of sound in the liquid and at a predetermined operating frequency, an elongated elastic structure longitudinally vibratory at said predetermined operating frequency in a longitudinal standing wave pattern, said structure being drivingly coupled at one end to said radiator, so as to be loaded thereby and by the liquid in which the radiator is immersed, cyclic mechanical force generator means drivingly coupled to the opposite end of said elongated elastic structure for applying to said structure a cyclic force oriented longitudinally thereof and at substantially said predetermined operating frequency, the vibratory system comprised of said generator means, elastic longitudinally vibratory structure and liquid-immersed radiator being resonant at said predetermined operating frequency, said elongated elastic structure when vibrating at said operating frequency in said standing wave pattern having a velocity node located substantially nearer its end coupled to said radiator than to its opposite end, and having a velocity antinode at its said opposite end, motor means in combination with said cyclic force generator means for driving said cyclic force generator means, and supporting structure for said motor means connected to but acoustically isolated from said elongated elastic vibratory structure.

24. The subject matter of claim 1, wherein said elongated elastic structure is of a length such as to have a natural resonant frequency for longitudinal vibration which is higher than that of said predetermined operating frequency when said structure is considered apart from the system.

25. The subject matter of claim 1 wherein said cyclic force generator embodies an eccentric mass rotor.

References Cited in the file of this patent

UNITED STATES PATENTS

| | | |
|---|---|---|
| 2,587,858 | Horsley et al. | Mar. 4, 1952 |
| 2,960,314 | Bodine | Nov. 15, 1960 |